United States Patent
Ikeda et al.

(10) Patent No.: US 10,565,944 B2
(45) Date of Patent: Feb. 18, 2020

(54) DISPLAY DEVICE

(71) Applicant: Japan Display Inc., Tokyo (JP)

(72) Inventors: Kojiro Ikeda, Tokyo (JP); Masaaki Kabe, Tokyo (JP); Chikyu Nakaoka, Tokyo (JP)

(73) Assignee: Japan Display Inc., Tokyo (JP)

( * ) Notice: Subject to any disclaimer, the term of this patent is extended or adjusted under 35 U.S.C. 154(b) by 38 days.

(21) Appl. No.: 15/962,612

(22) Filed: Apr. 25, 2018

(65) Prior Publication Data

US 2018/0315385 A1    Nov. 1, 2018

(30) Foreign Application Priority Data

May 1, 2017    (JP) ................................ 2017-091359

(51) Int. Cl.
*G09G 3/36*    (2006.01)
*G02F 1/1335*    (2006.01)
*G02F 1/133*    (2006.01)

(52) U.S. Cl.
CPC ....... *G09G 3/3607* (2013.01); *G02F 1/13306* (2013.01); *G02F 1/133514* (2013.01); *G09G 3/364* (2013.01); *G09G 3/3611* (2013.01); *G02F 2201/52* (2013.01); *G02F 2203/30* (2013.01)

(58) Field of Classification Search
CPC ........... G02F 1/13306; G02F 1/133514; G02F 2201/52; G02F 2203/30; G09G 3/3607; G09G 3/3611; G09G 3/364
See application file for complete search history.

(56) References Cited

U.S. PATENT DOCUMENTS

| | | | |
|---|---|---|---|
| 7,495,722 B2* | 2/2009 | Roth ................... | G09G 3/3607 |
| | | | 349/106 |
| 9,589,494 B2* | 3/2017 | Park ..................... | G09G 3/2003 |
| 2015/0138488 A1* | 5/2015 | Shiomi ............. | G02F 1/133603 |
| | | | 349/69 |
| 2016/0260401 A1 | 9/2016 | Sakaigawa | |
| 2017/0047026 A1 | 2/2017 | Tsuruma et al. | |

FOREIGN PATENT DOCUMENTS

| | | |
|---|---|---|
| JP | 4918028 B2 | 4/2012 |
| JP | 2013-242347 A1 | 12/2013 |
| JP | 2016-161920 A | 7/2016 |
| JP | 2016-161920 A | 9/2016 |

(Continued)

*Primary Examiner* — Nelson M Rosario
(74) *Attorney, Agent, or Firm* — K&L Gates LLP

(57) ABSTRACT

According to an aspect, a display device includes a plurality of pixels. Each pixel includes two sub-pixels adjacent to each other in a first direction. Each sub-pixel has one of three colors allocated thereto. Two colors of the two sub-pixels included in the pixel are different. The two colors of the two sub-pixels and a positional relation between the two sub-pixels are the same in each of the pixels arrayed in a second direction. One color not allocated to the two sub-pixels included in a first pixel out of the three colors is allocated to at least one of the sub-pixels included in second pixels adjacent to the first pixel in the first direction. The sub-pixels having the same color allocated thereto are arranged along the first direction with one sub-pixel interposed therebetween, the one sub-pixel having another color allocated thereto.

15 Claims, 28 Drawing Sheets

(56) References Cited

FOREIGN PATENT DOCUMENTS

| JP | 2017-037179 A1 | 2/2017 |
| WO | 2003/060869 A1 | 7/2003 |
| WO | 2003/060870 A1 | 7/2003 |
| WO | 2004/025611 A2 | 3/2004 |
| WO | 2005/101807 A2 | 10/2005 |

* cited by examiner

FIG.13
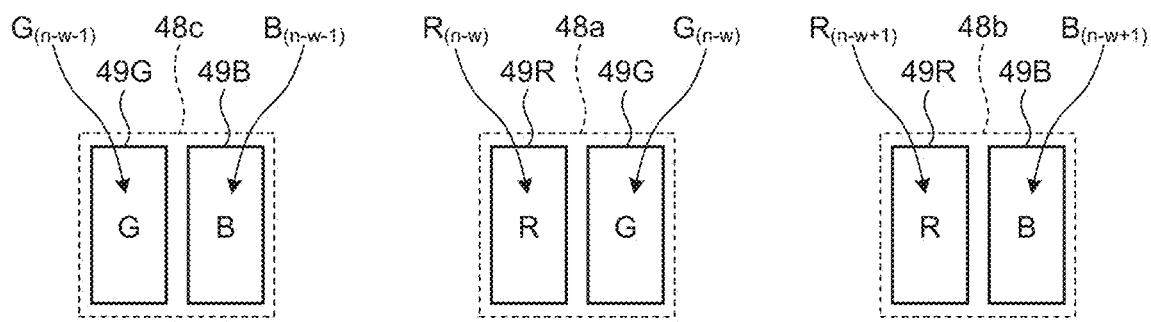
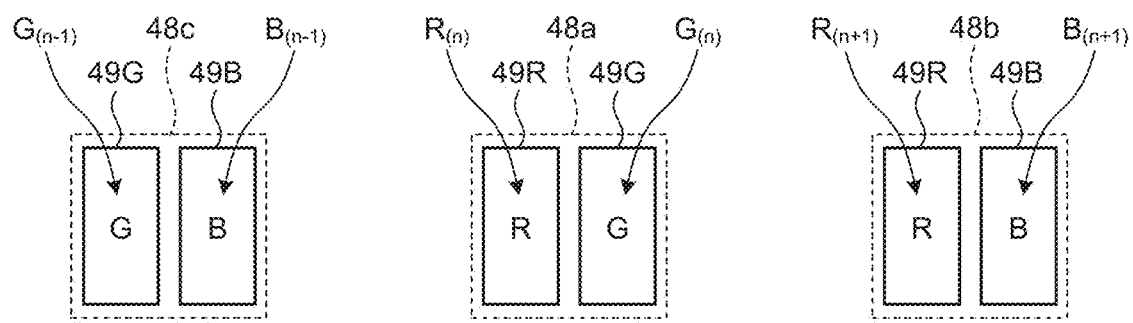
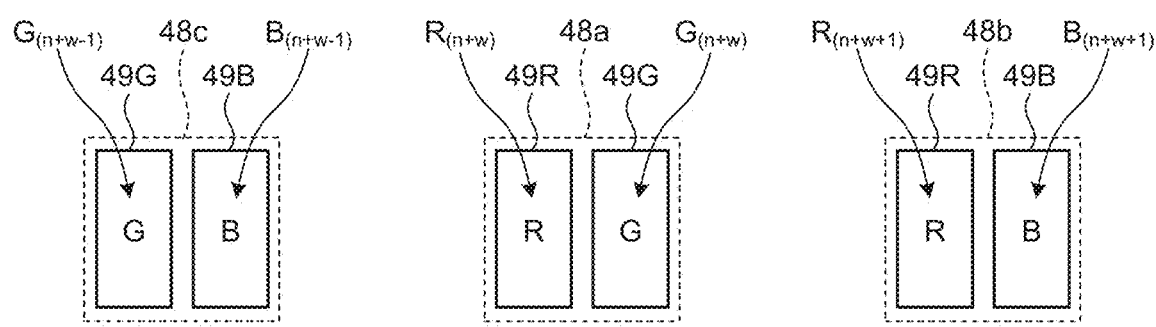

FIG.15
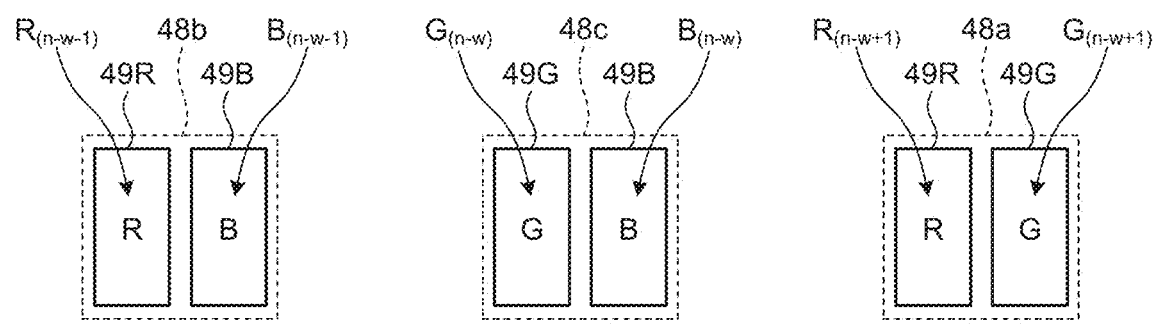
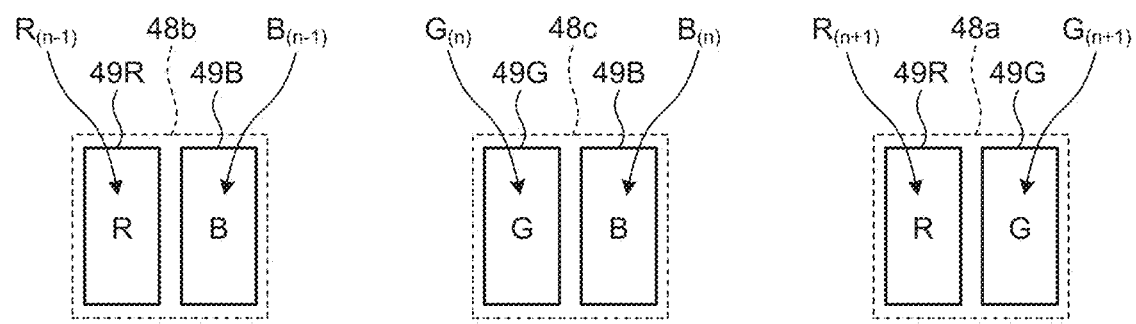
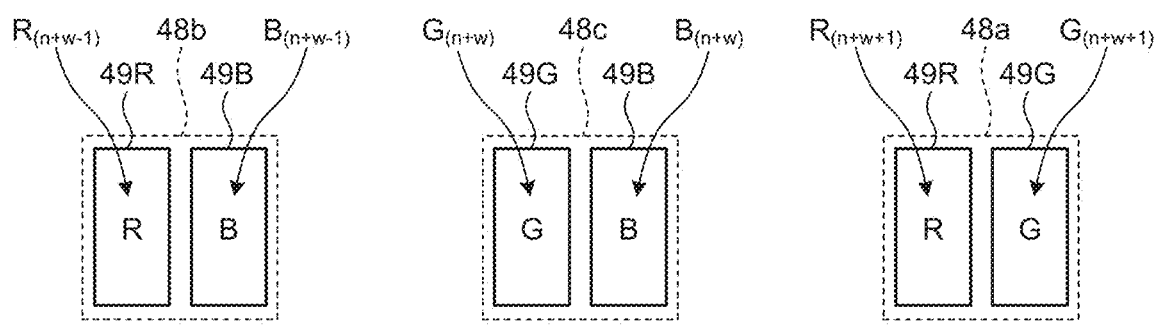

FIG.19

| | INPUT | | |
|---|---|---|---|
| PATTERN 1 | R:255 G:255 B:255 | R:205 G:205 B:205 | R:0 G:0 B:0 | R:200 G:200 B:200 | R:255 G:255 B:255 | R:0 G:0 B:0 |
| PATTERN 2 | R:0 G:0 B:0 | R:250 G:250 B:250 | R:210 G:210 B:210 | R:0 G:0 B:0 | R:190 G:190 B:190 | R:255 G:255 B:255 |
| PATTERN 3 | R:0 G:0 B:0 | R:0 G:0 B:0 | R:245 G:245 B:245 | R:215 G:215 B:215 | R:0 G:0 B:0 | R:190 G:190 B:190 |

FIG.20

CONVENTIONAL OUTPUT

| | | |
|---|---|---|
| PATTERN 1 | 48p R — R:205 G:245 B:234 — C 48q G — 48p R R:165 G:— B:234 — 48q B — R:— G:119 B:116 — 48r G — 48p R R:161 G:232 B:— — 48q G — C R:205 G:— B:244 — 48r B G B R:— G:148 B:73 | PATTERN 2 | 48p R R:78 G:145 B:— — 48q G — R:242 G:— B:201 — Y B — 48r G R:— G:233 B:169 — 48p R R:122 G:110 B:— — 48q G — R:228 G:— B:153 — 48r B Y G B R:— G:242 B:205 | PATTERN 3 | 48p R R:0 G:0 B:— — G B R:142 G:— B:0 — 48q R R:— G:197 B:239 — 48r G M B R:232 G:173 B:— — 48p G — 48q R R:110 G:— B:125 — 48r G B R:— G:153 B:177 |

FIG.21

| | OUTPUT ACCORDING TO FIRST EMBODIMENT | | |
|---|---|---|---|
| PATTERN 1 | 48a: G R — R:205 G:245 B:- | 48b: R B — R:165 G:- B:234 | 48c: G B — R:- G:119 B:116 | 48a: R G — R:161 G:232 B:- | 48b: R B — R:205 G:- B:244 | 48c: G B — R:- G:148 B:73 |
| PATTERN 2 | 48a: G R — R:78 G:145 B:- | 48b: R B — R:242 G:- B:201 | 48c: G B — R:- G:233 B:169 | 48a: R G — R:122 G:110 B:- | 48b: R B — R:228 G:- B:153 | 48c: G B — R:- G:242 B:205 |
| PATTERN 3 | 48a: G R — R:0 G:0 B:- | 48b: R B — R:142 G:- B:0 | 48c: G B — R:- G:197 B:239 | 48a: R G — R:232 G:173 B:- | 48b: R B — R:110 G:- B:125 | 48c: G B — R:- G:153 B:177 |

FIG.24

| | OUTPUT ACCORDING TO SECOND EMBODIMENT | | | | | | | | | | |
|---|---|---|---|---|---|---|---|---|---|---|---|
| PATTERN 1 | 48d G R | R: 205 G: 245 B: - | 48e B R | R: 165 G: - B: 234 | 48c G G | R: - G: 119 B: 116 | 48d G R | R: 161 G: 232 B: - | 48e B R | R: 205 G: - B: 244 | 48c G B | R: - G: 148 B: 73 |
| PATTERN 2 | 48d G R | R: 78 G: 145 B: - | 48e B R | R: 242 G: - B: 201 | 48c G B | R: - G: 233 B: 169 | 48d G R | R: 122 G: 110 B: - | 48e B R | R: 228 G: - B: 153 | 48c G B | R: - G: 242 B: 205 |
| PATTERN 3 | 48d G R | R: 0 G: 0 B: - | 48e B R | R: 142 G: - B: 0 | 48c G B | R: - G: 197 B: 239 | 48d G R | R: 232 G: 173 B: - | 48e B R | R: 110 G: - B: 125 | 48c G B | R: - G: 153 B: 177 |

FIG.27

OUTPUT ACCORDING TO THIRD EMBODIMENT

| Pattern | Cells (48a, 48b, 48f, 48a, 48b, 48f) | RGB values |
|---|---|---|
| PATTERN 1 | R G / B R / B G / R G / B R / B G | R:205 G:245 B:- ; R:165 G:- B:234 ; R:- G:119 B:116 ; R:161 G:232 B:- ; R:205 G:- B:244 ; R:- G:148 B:73 |
| PATTERN 2 | R G / B R / B G / R G / B R / B G | R:78 G:145 B:- ; R:242 G:- B:201 ; R:- G:233 B:169 ; R:122 G:110 B:- ; R:228 G:- B:153 ; R:- G:242 B:205 |
| PATTERN 3 | R G / B R / B G / R G / B R / B G | R:0 G:0 B:- ; R:142 G:- B:0 ; R:- G:197 B:239 ; R:232 G:173 B:- ; R:110 G:- B:125 ; R:- G:153 B:177 |

FIG.30

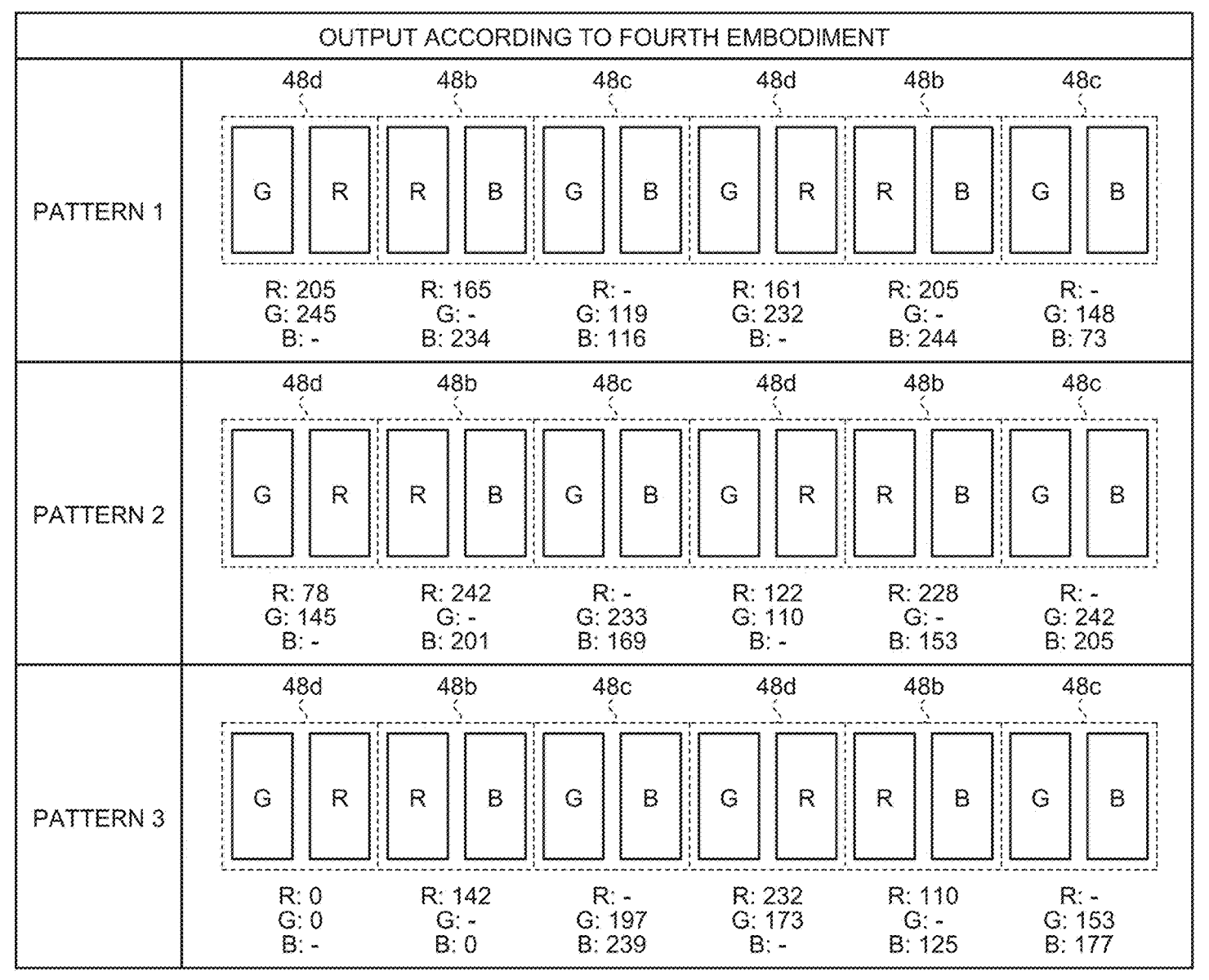

| | OUTPUT ACCORDING TO FOURTH EMBODIMENT | | |
|---|---|---|---|
| PATTERN 1 | 48d: G, R — R:205, G:245, B:— | 48b: R, B — R:165, G:—, B:234 | 48c: G, B — R:—, G:119, B:116 | 48d: G, R — R:161, G:232, B:— | 48b: R, B — R:205, G:—, B:244 | 48c: G, B — R:—, G:148, B:73 |
| PATTERN 2 | 48d: G, R — R:78, G:145, B:— | 48b: R, B — R:242, G:—, B:201 | 48c: G, B — R:—, G:233, B:169 | 48d: G, R — R:122, G:110, B:— | 48b: R, B — R:228, G:—, B:153 | 48c: G, B — R:—, G:242, B:205 |
| PATTERN 3 | 48d: G, R — R:0, G:0, B:— | 48b: R, B — R:142, G:—, B:0 | 48c: G, B — R:—, G:197, B:239 | 48d: G, R — R:232, G:173, B:— | 48b: R, B — R:110, G:—, B:125 | 48c: G, B — R:—, G:153, B:177 |

DISPLAY DEVICE

CROSS-REFERENCE TO RELATED APPLICATIONS

This application claims priority from Japanese Application No. 2017-091359, filed on May 1, 2017, the contents of which are incorporated by reference herein in its entirety.

BACKGROUND

1. Technical Field

The present disclosure relates to a display device.

2. Description of the Related Art

Display devices including pixels each having two sub-pixels are known. Such display devices perform allocation in which, out of the gradation values of three colors of each pixel included in an input image, an output corresponding to the gradation value of a color not included in colors of the two sub-pixels in a first pixel is allocated to a second pixel. The arrangement of the sub-pixels and the allocation in the conventional technique, however, may possibly cause display output that makes patterns not included in the input image visible.

SUMMARY

According to an aspect, a display device includes a plurality of pixels arrayed in a row direction and a column direction. Each pixel includes two sub-pixels adjacent to each other in a first direction, the first direction being one of the row direction and the column direction. Each sub-pixel has one of three colors allocated thereto. Two colors of the two sub-pixels included in the pixel are different. The two colors of the two sub-pixels and a positional relation between the two sub-pixels are the same in each of the pixels arrayed in a second direction, the second direction being the other of the row direction and the column direction. One color not allocated to the two sub-pixels included in a first pixel out of the three colors is allocated to at least one of the sub-pixels included in second pixels adjacent to the first pixel in the first direction. The sub-pixels having the same color allocated thereto are arranged along the first direction with one sub-pixel interposed therebetween, the one sub-pixel having another color allocated thereto.

BRIEF DESCRIPTION OF THE DRAWINGS

FIG. 13 is a diagram schematically illustrating the relation between first pixels and pixels adjacent to the first pixels;

FIG. 15 is a diagram schematically illustrating the relation between third pixels and pixels adjacent to the third pixels;

FIG. 19 is a diagram of patterns of input signals that cause coloring in the second comparative example;

FIG. 20 is a diagram schematically illustrating a mechanism that causes coloring when the second comparative example illustrated in FIG. 18 performs display output based on the input signals illustrated in FIG. 19;

FIG. 21 is a diagram of an example of color allocation according to the first embodiment;

FIG. 24 is a diagram of an example of color allocation according to the second embodiment;

FIG. 27 is a diagram of an example of color allocation according to the third embodiment;

FIG. 30 is a diagram of an example of color allocation according to the fourth embodiment.

DETAILED DESCRIPTION

Figure 1:
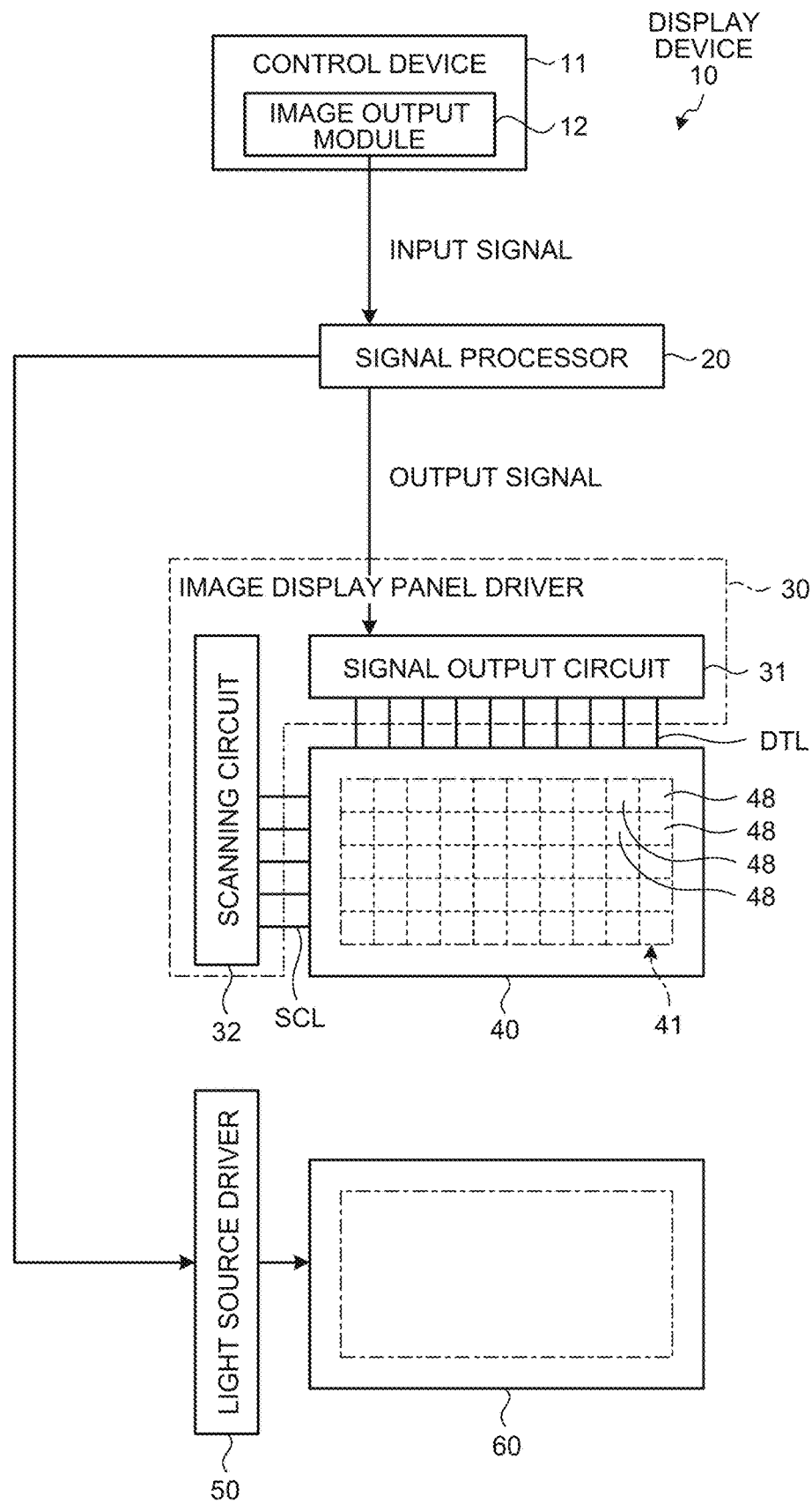
FIG. 1 is a block diagram of an exemplary configuration of a display device according to a first embodiment of the present invention.

Exemplary embodiments of the present invention are described below with reference to the accompanying drawings. What is disclosed herein is given by way of example only, and appropriate modifications made without departing from the spirit of the present invention and easily conceivable by those skilled in the art naturally fall within the scope of the invention. To simplify the explanation, the drawings may possibly illustrate the width, the thickness, the shape, and other elements of each component more schematically than the actual aspect. These elements, however, are given by way of example only and are not intended to limit interpretation of the present invention. In the present specification and the figures, components similar to those previously described with reference to previous figures are denoted by the same reference numerals, and detailed explanation thereof may be appropriately omitted.

In this disclosure, when an element is described as being "on" another element, the element can be directly on the other element, or there can be one or more elements between the element and the other element.

It is known that there are display devices including pixels each having two sub-pixels as disclosed in Japanese Patent No. 4918028 and Japanese Patent Application Laid-open Publication No. 2013-242347.

First Embodiment

Figure 2:
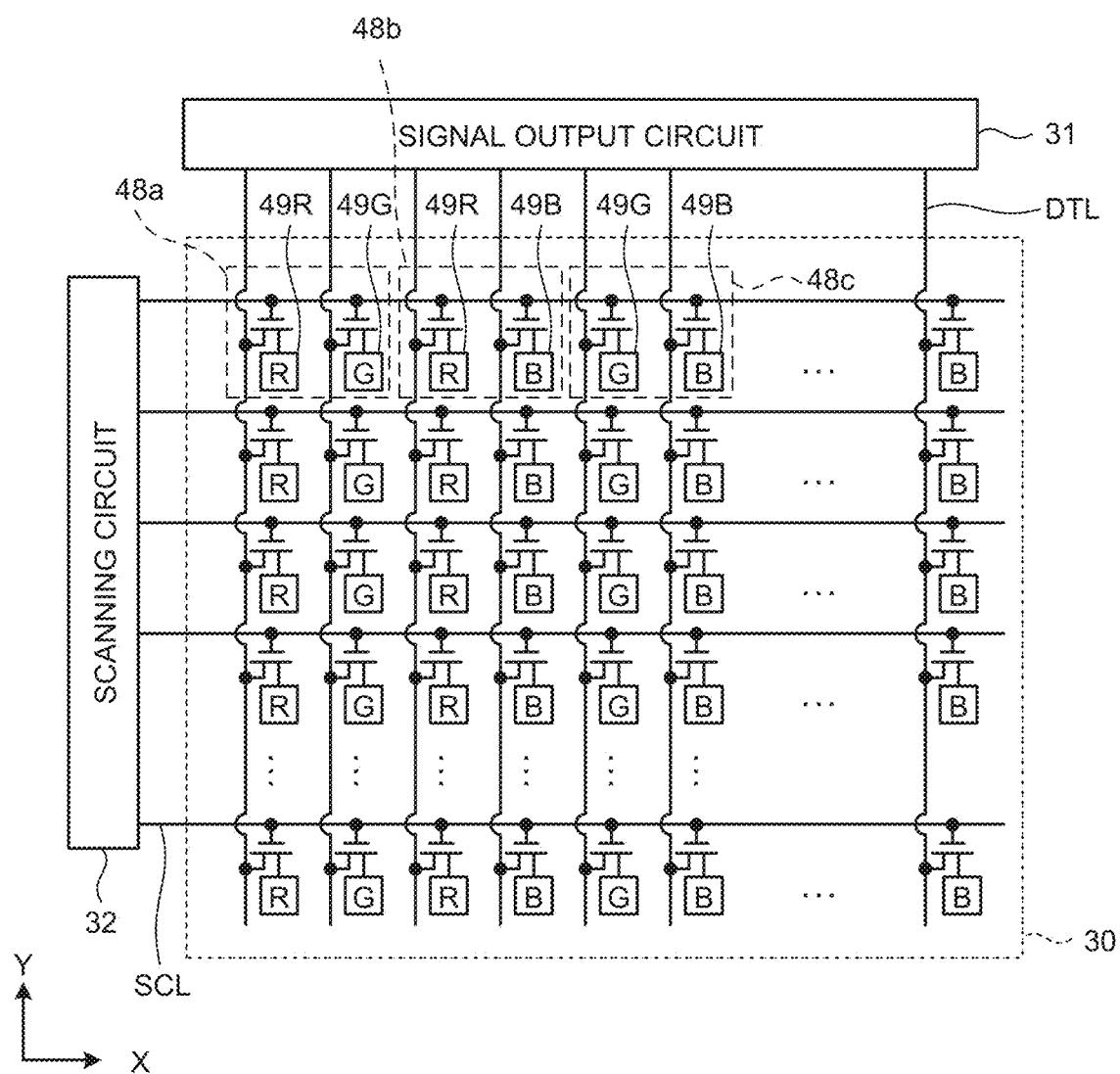
FIG. 2 is a conceptual diagram of an image display panel according to the first embodiment.

FIG. 1 is a block diagram of an exemplary configuration of a display device 10 according to a first embodiment of the present invention. FIG. 2 is a conceptual diagram of an image display panel 40 according to the first embodiment. As illustrated in FIG. 1, the display device 10 according to the first embodiment includes a signal processor 20, an image display panel driver 30, the image display panel 40, a light source driver 50, and a light source unit 60. The signal processor 20 receives input signals (RGB data) from an image output module 12 of a control device 11. The signal processor 20 transmits signals generated by performing predetermined data conversion on the input signals to the components of the display device 10. The image display panel driver 30 controls driving of the image display panel 40 based on the signals from the signal processor 20. The light source driver 50 controls driving of the light source unit 60 based on the signals from the signal processor 20. The light source unit 60 irradiates the image display panel 40 from its back surface based on the signals from the light source driver 50. The image display panel 40 displays an image by the signals from the image display panel driver 30 and the light from the light source unit 60.

The image display panel 40 includes 12 or more pixels 48 arrayed in a two-dimensional matrix (row-column configuration) on an image display surface 41 on which an image is displayed. In the example illustrated in FIG. 1, a plurality of pixels 48 are arrayed in a matrix (row-column configuration) in the X-Y two-dimensional coordinate system. While the X-direction in this example is the row direction, and the Y-direction is the column direction, the directions are not limited thereto. The X-direction may be the vertical direction, and the Y-direction may be the horizontal direction. Each of the pixels 48 according to the first embodiment is any one of a first pixel 48a, a second pixel 48b, and a third pixel 48c (refer to FIGS. 2 and 3), which will be described later.

The pixels 48 each include two of a first sub-pixel 49R, a second sub-pixel 49G, and a third sub-pixel 49B. The first sub-pixel 49R displays a first color (e.g., red). The second sub-pixel 49G displays a second color (e.g., green). The third sub-pixel 49B displays a third color (e.g., blue). The first, the second, and the third colors are not limited to red, green, and blue, respectively. They may be complementary colors, for example, and simply need to be different colors. In the following description, the first sub-pixel 49R, the second sub-pixel 49G, and the third sub-pixel 49B are referred to as sub-pixels 49 when they need not be distinguished from one another. In other words, one of the three colors is allocated to one sub-pixel 49.

The image display panel 40 according to the first embodiment is a transmissive color liquid crystal display panel, for example. The image display panel 40 includes a first color filter between the first sub-pixel 49R and an image observer. The first color filter allows light in the first color to pass therethrough. The image display panel 40 also includes a second color filter between the second sub-pixel 49G and the image observer. The second color filter allows light in the second color to pass therethrough. The image display panel 40 also includes a third color filter between the third sub-pixel 49B and the image observer. The third color filter allows light in the third color to pass therethrough.

The image display panel driver 30 includes a signal output circuit 31 and a scanning circuit 32. The image display panel driver 30 causes the signal output circuit 31 to retain output signals and sequentially output them to the image display panel 40. More specifically, the signal output circuit 31 outputs, to the image display panel 40, image signals each having a predetermined electric potential corresponding to the output signal from the signal processor 20. The signal output circuit 31 is electrically coupled to the image display panel 40 via signal lines DTL. The scanning circuit 32 controls turning on and off of switching elements, each switching element controlling an operation (light transmittance) of the corresponding sub-pixel 49 in the image display panel 40. The switching element is fabricated from thin-film transistors (TFT), for example. The scanning circuit 32 is electrically coupled to the image display panel 40 via wires SCL.

The light source unit 60 is disposed on the back surface of the image display panel 40. The light source unit 60 outputs light to the image display panel 40, thereby irradiating the image display panel 40.

Figure 3:
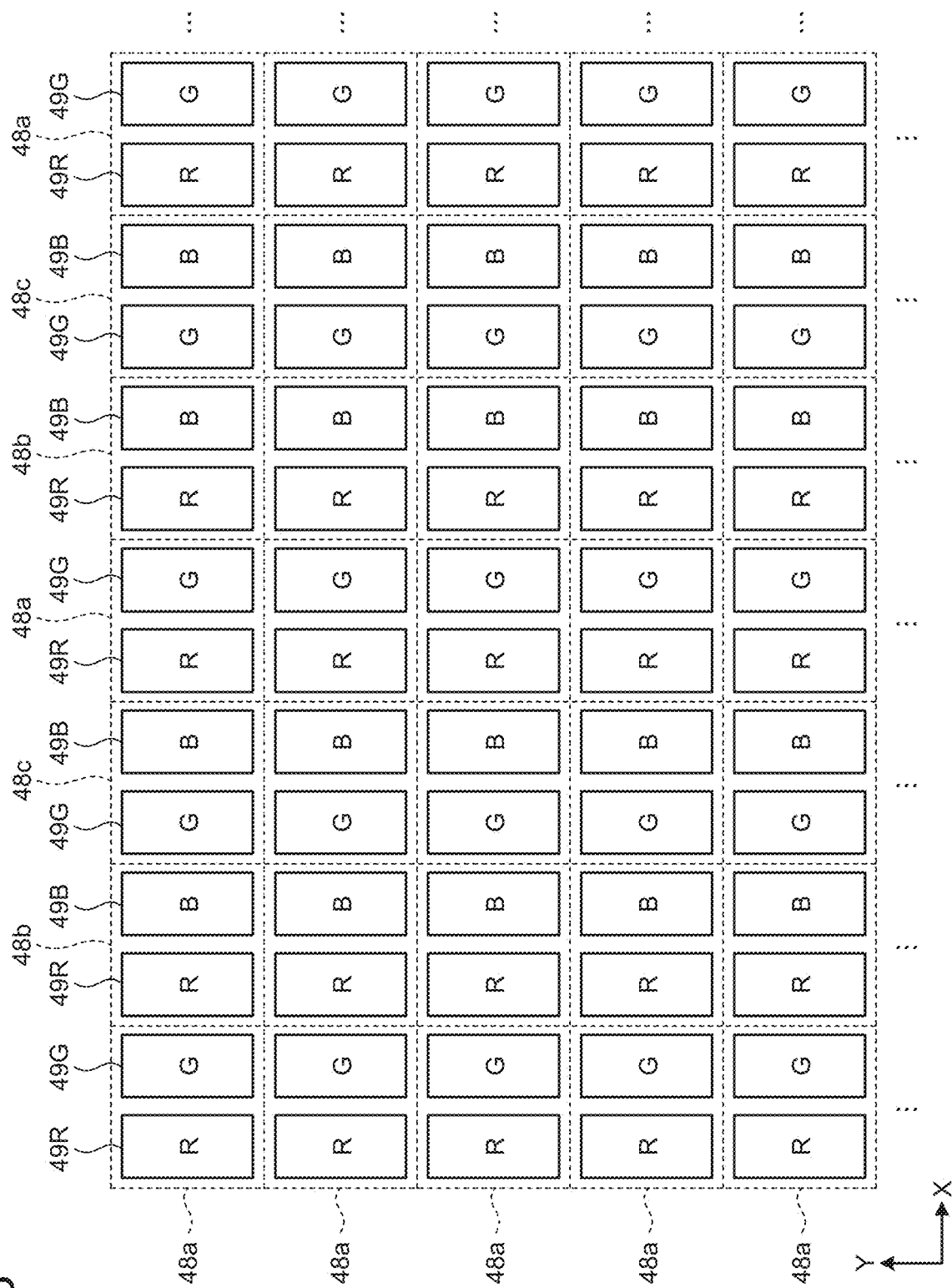
FIG. 3 is a diagram of an example of an arrangement of a plurality of pixels and an arrangement of sub-pixels included in the pixels according to the first embodiment.

FIG. 3 is a diagram of an example of an arrangement of a plurality of pixels 48 and an arrangement of sub-pixels 49 included in the pixels 48 according to the first embodiment. As illustrated in FIGS. 2 and 3, each of the pixels 48 according to the first embodiment is any one of the first pixel 48a, the second pixel 48b, and the third pixel 48c. The first pixel 48a includes the first sub-pixel 49R and the second sub-pixel 49G. In the first pixel 48a, the first sub-pixel 49R is disposed relatively on a first end side in the X-direction, and the second sub-pixel 49G is disposed on a second end side. In the positional relation between the first end and the second end sides, for example, the first end side corresponds to the left side, and the second end side corresponds to the right side when a user views the image display surface 41 with the Y-direction extending along the vertical direction. The second pixel 48b includes the first sub-pixel 49R and the third sub-pixel 49B. In the second pixel 48b, the first sub-pixel 49R is disposed relatively on the first end side in the X-direction, and the third sub-pixel 49B is disposed on the second end side. The third pixel 48c includes the second sub-pixel 49G and the third sub-pixel 49B. In the third pixel 48c, the second sub-pixel 49G is disposed relatively on the first end side in the X-direction, and the third sub-pixel 49B is disposed on the second end side. As described above, one pixel 48 includes two sub-pixels 49 adjacent to each other in a first direction (e.g., the X-direction). The colors of the two sub-pixels 49 included in one pixel 48 are different from each other. In FIGS. 2 and 3, the left side corresponds to the first end side in the X-direction, and the right side corresponds to the second end side in the X-direction.

The first pixel 48a, the second pixel 48b, and the third pixel 48c are arrayed in a predetermined order from the first end side to the second end side in the X-direction of the image display surface 41. The pixels 48 according to the first embodiment are arrayed in the order of the first pixel 48a, the second pixel 48b, the third pixel 48c, the first pixel 48a, the second pixel 48b, the third pixel 48c, . . . , for example. In other words, the second pixel 48b is disposed on the second end side of the first pixel 48a. The third pixel 48c is disposed on the second end side of the second pixel 48b. The first pixel 48a is disposed on the second end side of the third pixel 48c. In this manner, the first pixel 48a, the second pixel 48b, and the third pixel 48c are periodically arranged to the second end side in the X-direction of the image display surface 41. In other words, the third pixel 48c is disposed on the first end side of the first pixel 48a except at the first end side in the X-direction of the image display surface 41. The second pixel 48b is disposed on the first end side of the third pixel 48c. The first pixel 48a is disposed on the first end side of the second pixel 48b. As described above, one color not allocated to the two sub-pixels 49 in one pixel 48 out of the three colors is allocated to one of the two sub-pixels 49 included in another pixel 48 adjacent to the one pixel 48 in the first direction (e.g., the X-direction).

The following describes the colors of the sub-pixels 49 (the first sub-pixel 49R, the second sub-pixel 49G, and the third sub-pixel 49B) and the arrangement order of the sub-pixels 49 in the X-direction. The sub-pixels 49 are disposed in each pixel row such that the first sub-pixel 49R, the second sub-pixel 49G, the first sub-pixel 49R, the third sub-pixel 49B, the second sub-pixel 49G, and the third sub-pixel 49B are repeatedly arranged in this order from the first end side to the second end side in the X-direction of the image display surface 41. In other words, two first sub-pixels 49R to which the first color (e.g., red) is allocated are arranged along the X-direction with one second sub-pixel 49G interposed therebetween, the one second sub-pixel 49G being a sub-pixel to which the second color (e.g., green) is allocated. Two third sub-pixels 49B to which the third color (e.g., blue) is allocated are arranged along the X-direction with one second sub-pixel 49G interposed therebetween, the one second sub-pixel 49G being a sub-pixel to which the second color (e.g., green) is allocated. As described above, the arrangement of the sub-pixels 49 in the image display panel 40 includes the following arrangement: sub-pixels 49 to which the same color is allocated are arranged along the first direction (e.g., the X-direction) with one sub-pixel 49 interposed therebetween, the one sub-pixel 49 being a sub-pixel to which another color is allocated. In the configuration according to the first embodiment, sub-pixels 49 to which one of two colors (e.g., red and blue) out of the three colors is allocated are arranged along the first direction (e.g., the X-direction) with one sub-pixel 49 interposed therebetween, the one sub-pixel 49 being a sub-pixel to which the remaining color (e.g., green) other than the two colors out of the three colors is allocated.

As described above, each pixel 48 includes two sub-pixels 49. The two colors of the two sub-pixels 49 and the positional relation between the two sub-pixels 49 are the same in each of the pixels 48 arrayed in a second direction (e.g., the Y-direction). As illustrated in FIG. 3, for example, the same kinds of pixels 48, that is, the first pixels 48a, the second pixels 48b, and the third pixels 48c are each continuously arrayed in the Y-direction. Consequently, the sub-pixels 49 of the same color are continuously arrayed in terms of the colors of the sub-pixels 49 (the first sub-pixel 49R, the second sub-pixel 49G, and the third sub-pixel 49B) and the arrangement in the Y-direction.

The display device 10 including the pixels 48 and the sub-pixels 49 disposed as described above can prevent or reduce display output in which bright-and-dark patterns not included in an input image are visually recognized. The following describes the relation between the display device 10 and bright-and-dark patterns not included in an input image with reference to FIGS. 4 to 12.

Figure 4:
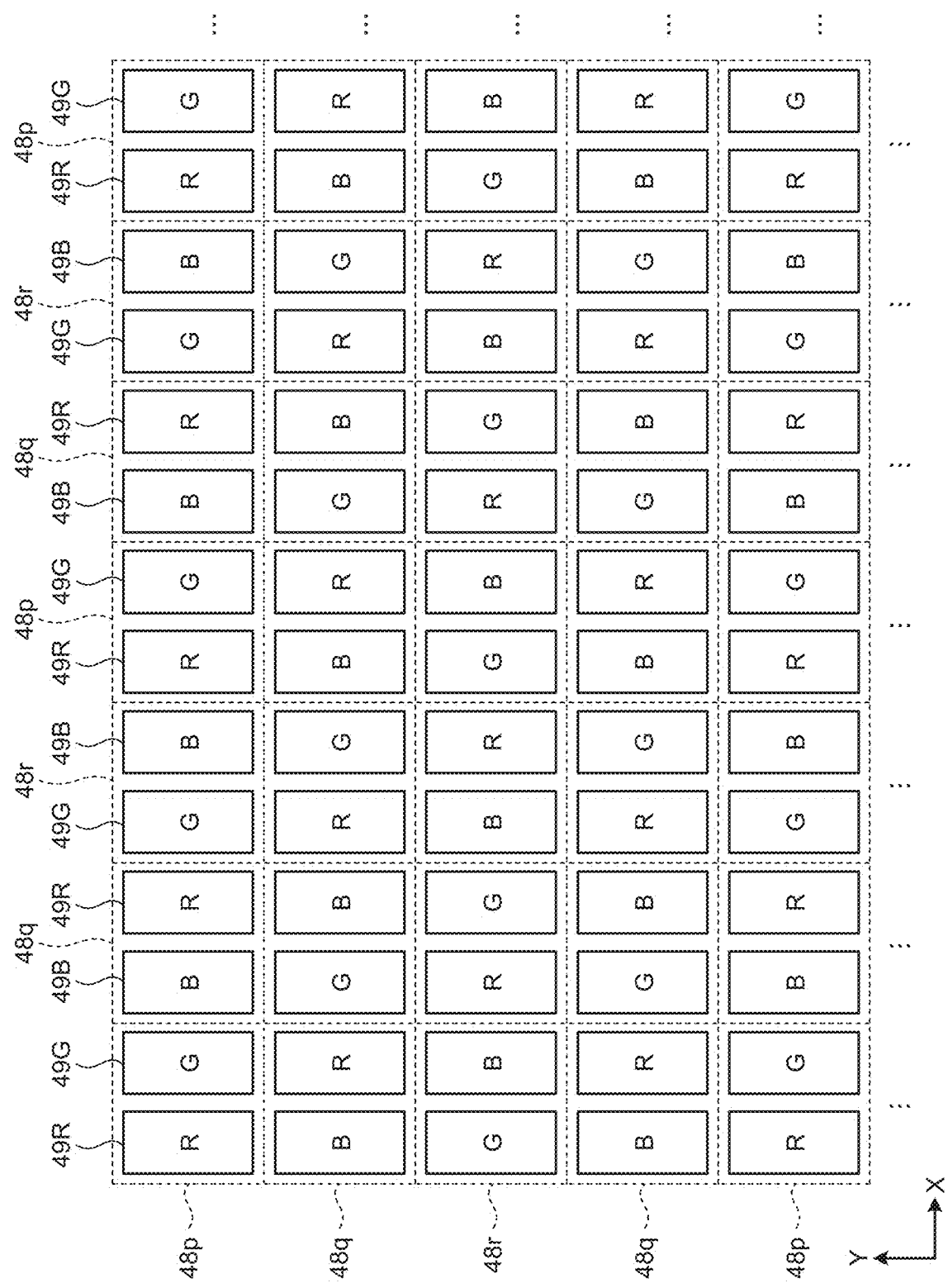
FIG. 4 is a diagram of an exemplary arrangement of the pixels and the sub-pixels according to a first comparative example.

FIG. 4 is a diagram of an exemplary arrangement of the pixels and the sub-pixels 49 according to a first comparative example. In the first comparative example, the sub-pixels 49 are disposed such that the first sub-pixel 49R, the second sub-pixel 49G, and the third sub-pixel 49B are repeatedly arranged in this order from the first end side to the second end side in the X-direction of an image display surface. In the first comparative example, the sub-pixels 49 includes pixel columns in each of which the first sub-pixel 49R, the third sub-pixel 49B, the second sub-pixel 49G, and the third sub-pixel 49B are repeatedly arranged in this order from a first end side to a second end side in the Y-direction of the image display surface.

Relating to the arrangement of the sub-pixels 49, each of the pixels 48 in the first comparative example is any one of a seventh pixel 48p, an eighth pixel 48q, and a ninth pixel 48r. The seventh pixel 48p includes the first sub-pixel 49R and the second sub-pixel 49G. In the seventh pixel 48p, the first sub-pixel 49R is disposed relatively on the first end side in the X-direction, and the second sub-pixel 49G is disposed on the second end side. The eighth pixel 48q includes the third sub-pixel 49B and the first sub-pixel 49R. In the eighth pixel 48q, the third sub-pixel 49B is disposed relatively on the first end side in the X-direction, and the first sub-pixel 49R is disposed on the second end side. The ninth pixel 48r includes the second sub-pixel 49G and the third sub-pixel 49B. In the ninth pixel 48r, the second sub-pixel 49G is disposed relatively on the first end side in the X-direction, and the third sub-pixel 49B is disposed on the second end side. The seventh pixel 48p, the eighth pixel 48q, and the ninth pixel 48r are disposed such that the seventh pixel 48p, the eighth pixel 48q, and the ninth pixel 48r are repeatedly arranged in this order from the first end side to the second end side in the X-direction. The pixels 48 including the seventh pixel 48*p*, the eighth pixel 48*q*, and the ninth pixel 48*r* includes pixel columns in each of which the seventh pixel 48*p*, the eighth pixel 48*q*, the ninth pixel 48*r*, and the eighth pixel 48*q* are repeatedly arranged in this order from the first end side to the second end side in the Y-direction.

Figure 5:
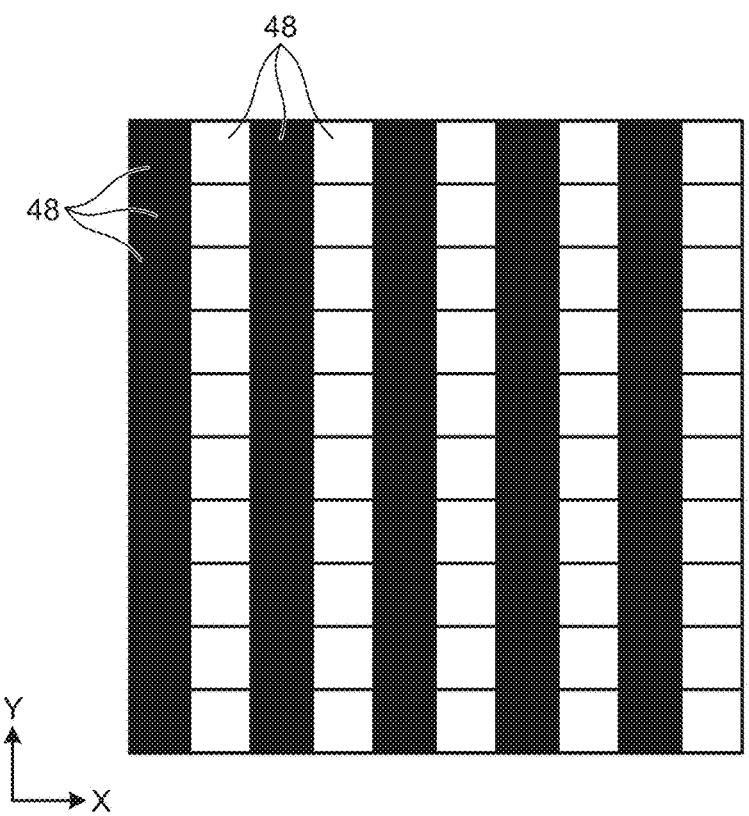
FIG. 5 is a diagram of a schematic example of an image in which black pixel columns and white pixel columns are alternately arranged in an X-direction.
Figure 6:
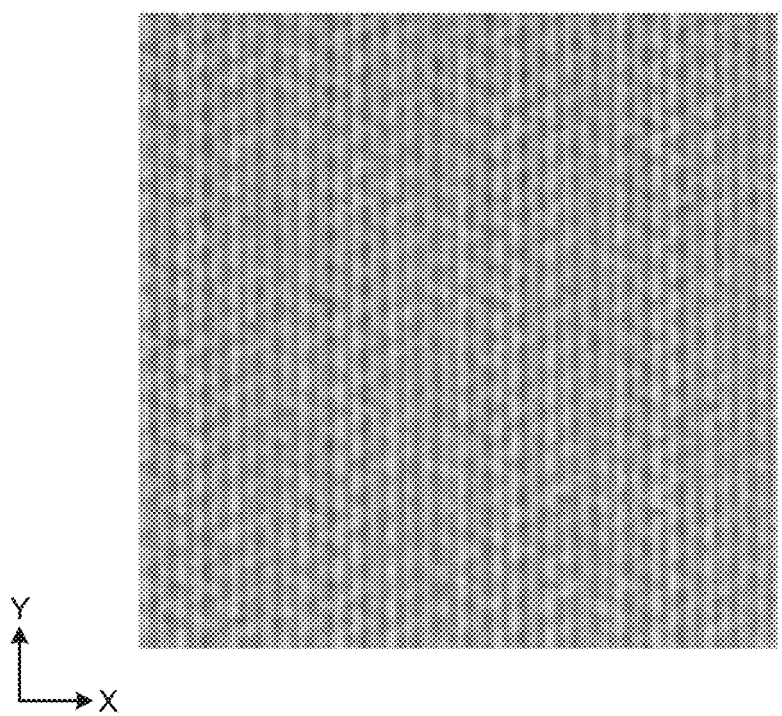
FIG. 6 is a diagram of an image of exemplary display output obtained when the image illustrated in FIG. 5 is received by the first comparative example illustrated in FIG. 4.

FIG. 5 is a diagram of a schematic example of an image in which black pixel columns and white pixel columns are alternately arranged in the X-direction. FIG. 6 is a diagram of an image of exemplary display output obtained when the image illustrated in FIG. 5 is received by the first comparative example illustrated in FIG. 4. Each of the black pixel columns is a pixel column displaying black color. Each of the white columns is a pixel column displaying white color. In display output corresponding to the input image of the stripe image including only black and white pixel columns extending in the Y-direction illustrated in FIG. 5, for example, the configuration of the first comparative example causes stepwise patterns extending in directions intersecting the X-direction and the Y-direction to be visually recognized. The stepwise patterns are bright-and-dark patterns not included in the input image.

Figure 7:
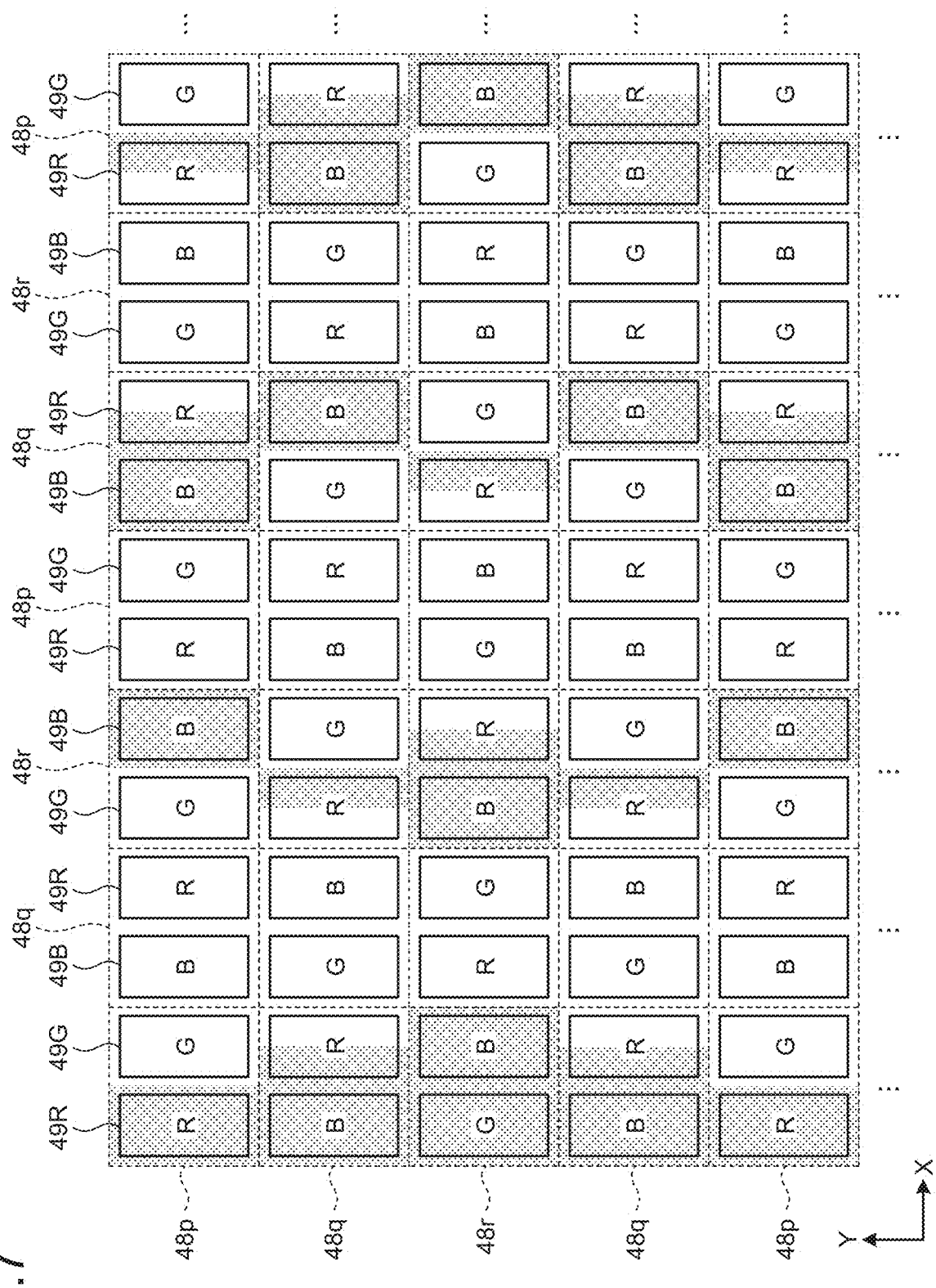
FIG. 7 is a diagram schematically illustrating stepwise patterns included in the image illustrated in FIG. 6.

FIG. 7 is a diagram schematically illustrating stepwise patterns included in the image illustrated in FIG. 6. The hatching in FIG. 7 schematically indicates the stepwise patterns including bends intersecting the X-direction and the Y-direction in FIG. 6. As illustrated in FIGS. 4 and 7, the seventh pixel 48*p*, the eighth pixel 48*q*, and the ninth pixel 48*r* each include the sub-pixels 49 of two colors out of the three colors of red (R), green (G), and blue (B). In other words, the seventh pixel 48*p*, the eighth pixel 48*q*, and the ninth pixel 48*r* each do not include the sub-pixel 49 of one color out of the three colors. To perform display output of white, however, the color components of the three colors are required. To address this, control for display output of white is performed in the first comparative example such that the sub-pixels 49 adjacent in the X-direction to the seventh pixel 48*p*, the eighth pixel 48*q*, and the ninth pixel 48*r* provided at positions corresponding to the white pixel column in the input image. Specifically, the first comparative example, for example, turns on two third sub-pixels 49B adjacent in the X-direction to the seventh pixel 48*p* including the first sub-pixel 49R and the second sub-pixel 49G, thereby reproducing white. The blue component, which is the color component of the sub-pixel 49 not included in the seventh pixel 48*p*, is divided into halves and distributed to the two third sub-pixels 49B adjacent to the seventh pixel 48*p* in the X-direction. With the same mechanism, two second sub-pixels 49G adjacent to the eighth pixel 48*q* in the X-direction are turned on, and two first sub-pixels 49R adjacent to the ninth pixel 48*r* in the X-direction are turned on.

The seventh pixel 48*p*, the eighth pixel 48*q*, and the ninth pixel 48*r* included in the white pixel column are controlled to perform display output corresponding to the same gradation value. When the sub-pixels 49 are turned on to perform display output corresponding to the same gradation value, they look brighter to human eyes in the order of green (G), red (R), and blue (B). With the same gradation value, the second sub-pixel 49G looks brighter than the first sub-pixel 49R and the third sub-pixel 49B. The first sub-pixel 49R looks brighter than the third sub-pixel 49B. In other words, the third sub-pixels 49B adjacent to the seventh pixel 48*p* relatively looks darkest out of the seventh pixel 48*p*, the eighth pixel 48*q*, and the ninth pixel 48*r* continuously arrayed in the Y-direction. As a result, the third sub-pixels 49B are visually recognized as dark portions integrated with display output of the black pixel columns adjacent to the white pixel column. The second sub-pixels 49G adjacent to the eighth pixel 48*q* relatively look brightest. As a result, the second sub-pixels 49G are visually recognized as bright portions integrated with the white pixel column. The first sub-pixels 49R adjacent to the ninth pixel 48*r* are visually recognized as intermediate gradation portions between the bright portion and the dark portion.

As described with reference to FIG. 4, the configuration of the first comparative example includes pixel columns in each of which the seventh pixel 48*p*, the eighth pixel 48*q*, the ninth pixel 48*r*, and the eighth pixel 48*q* are repeatedly arranged in this order from the first end side to the second end side in the Y-direction of the image display surface. As a result, display output of the sub-pixels 49 adjacent to the white pixel column includes one or more sub-pixel columns each of which is visually recognized such that the bright portion, the intermediate gradation portion, the dark portion, and the intermediate gradation portion are repeatedly arranged in this order. The repetitive patterns of the bright portion, the intermediate gradation portion, the dark portion, and the intermediate gradation portion are visually recognized as the stepwise patterns.

Figure 8:
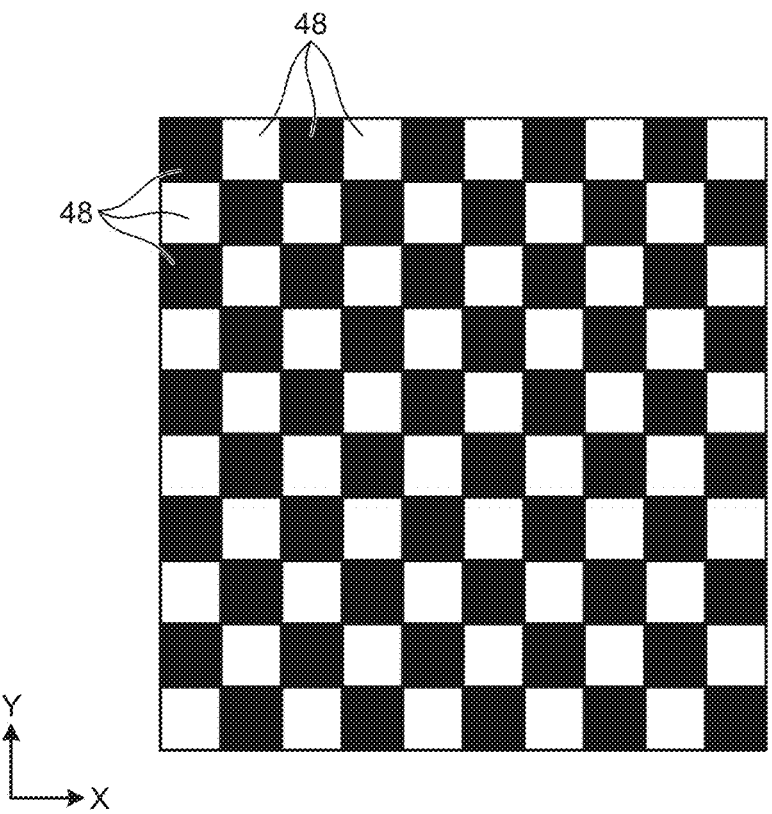
FIG. 8 is a diagram of a schematic example of a checkered image in which black pixel columns and white pixel columns are arrayed in a staggered manner in the X-direction.
Figure 9:
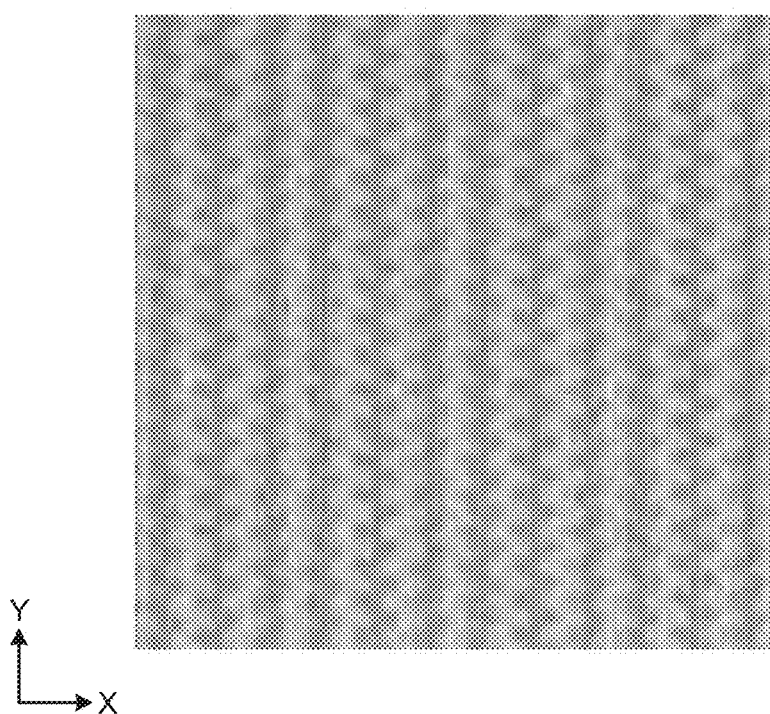
FIG. 9 is a diagram of an image of exemplary display output obtained when the image illustrated in FIG. 8 is received by the first comparative example illustrated in FIG. 4.

FIG. 8 is a diagram of a schematic example of a checkered image in which black pixel columns and white pixel columns are arranged in a staggered manner in the X-direction. FIG. 9 is a diagram of an image of exemplary display output obtained when the image illustrated in FIG. 8 is received by the first comparative example illustrated in FIG. 4. In display output corresponding to the checkered input image illustrated in FIG. 8, for example, the first comparative example causes zigzag patterns including inclinations in oblique directions intersecting the X-direction and the Y-direction to be visually recognized. The zigzag patterns are bright-and-dark patterns not included in the input image.

Figure 10:
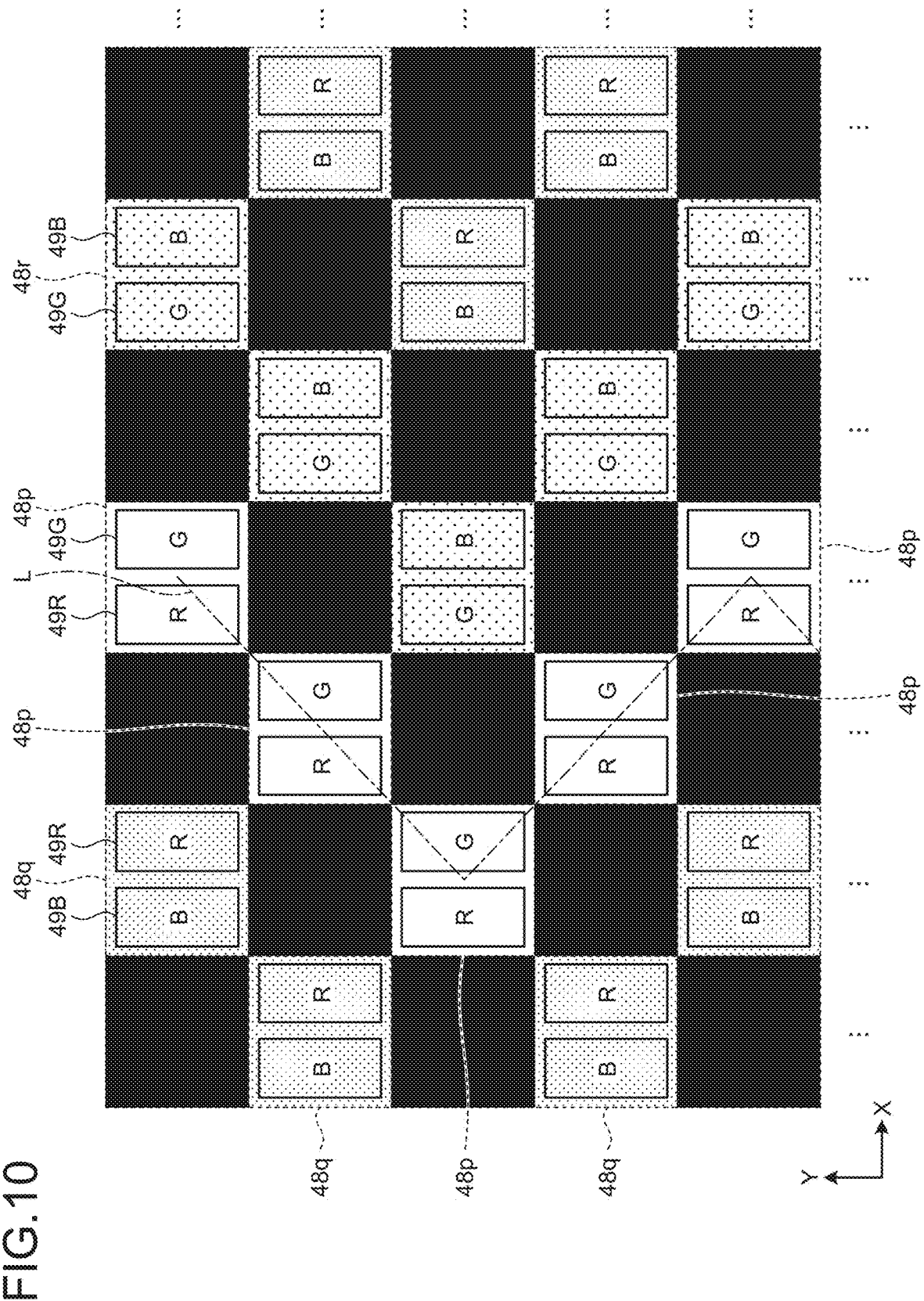
FIG. 10 is a diagram schematically illustrating zigzag patterns included in the image illustrated in FIG. 9.

FIG. 10 is a diagram schematically illustrating zigzag patterns included in the image illustrated in FIG. 9. The alternate long and short dash line L in FIG. 10 schematically indicates a bright zigzag pattern out of the zigzag patterns in FIG. 9. As described above, when the sub-pixels 49 are turned on to perform display output corresponding to the same gradation value, they look brighter to human eyes in the order of green (G), red (R), and blue (B). As a result, the seventh pixel 48*p* including the first sub-pixel 49R and the second sub-pixel 49G looks brightest. In the first comparative example, the seventh pixel 48*p*, the eighth pixel 48*q*, and the ninth pixel 48*r* are repeatedly arranged in this order from the first end side to the second end side in the X-direction of the image display surface. The pixels 48 include pixel columns in each of which the seventh pixel 48*p*, the eighth pixel 48*q*, the ninth pixel 48*r*, and the eighth pixel 48*q* are repeatedly arranged in this order from the first end side to the second end side in the Y-direction of the image display surface. With this configuration, the seventh pixels 48*p* are continuously arrayed obliquely from the first end side to the second end side in the X-direction within a range of the width of three pixels in the X-direction. The series of the seventh pixels 48*p* turns back on the second end side, are continuously arrayed obliquely toward the first end side, and turns back again on the first end side. As a result, the seventh pixels 48*p* are formed into a continuous zigzag pattern. Because the seventh pixels 48*p* arrayed in this manner look brightest, a bright zigzag pattern is visually recognized as indicated by the alternate long and short dash line L. Technically, also in the display output of the checkered image, the first comparative example turns on the sub-pixels 49 adjacent in the X-direction to the seventh pixel 48*p*, the eighth pixel 48*q*, and the ninth pixel 48*r* that perform display output of white as described with reference to FIG. 7. In the explanation with reference to FIG. 10, however, the description of the turning on of the adjacent sub-pixels 49 is omitted to simplify the explanation.

As described with reference to FIGS. 5 to 10, the first comparative example may possibly cause the bright-and-dark patterns not included in the input image to be visually recognized. By contrast, the first embodiment can prevent or reduce generation of the bright-and-dark patterns.

Figure 11:
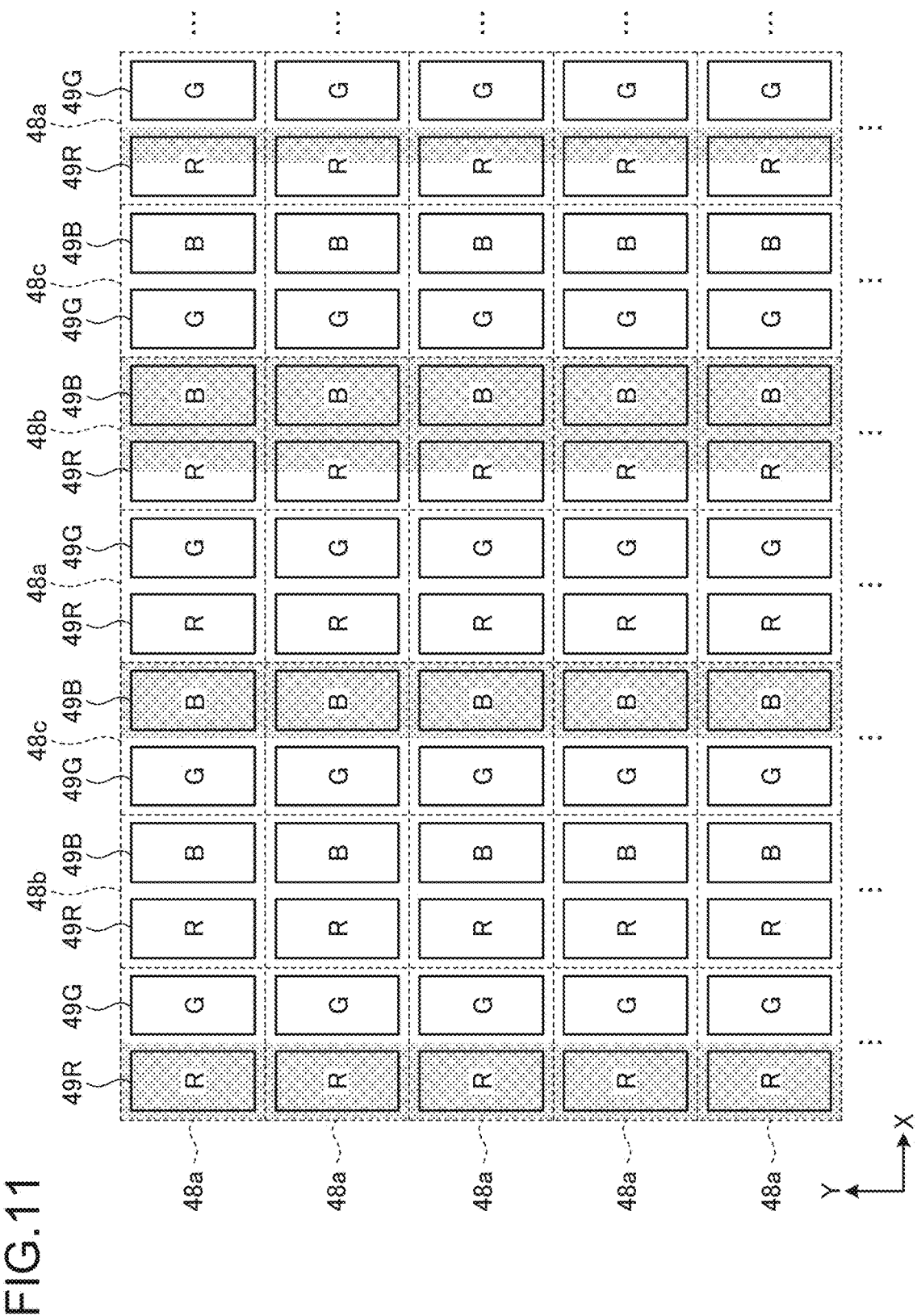
FIG. 11 is a diagram schematically illustrating exemplary display output obtained when the image illustrated in FIG. 5 is received by the display device according to the first embodiment.

FIG. 11 is a diagram schematically illustrating exemplary display output obtained when the image illustrated in FIG. 5 is received by the display device 10 according to the first embodiment. In the configuration according to the first embodiment, each pixel 48 includes two sub-pixels 49, and the two colors of the two sub-pixels 49 and the positional relation between the two sub-pixels 49 are the same in each of the pixels 48 arrayed in the Y-direction. If the sub-pixels 49 adjacent to the pixels 48 disposed at positions corresponding to the white pixel column are turned on, the bright portion, the intermediate gradation portion, and the dark portion are not alternately arranged in the Y-direction. Consequently, the display device 10 according to the first embodiment prevents the stepwise patterns including bends intersecting the X-direction and the Y-direction illustrated in FIG. 6 from being visually recognized in display output corresponding to the input image of the stripe image illustrated in FIG. 5.

Figure 12:
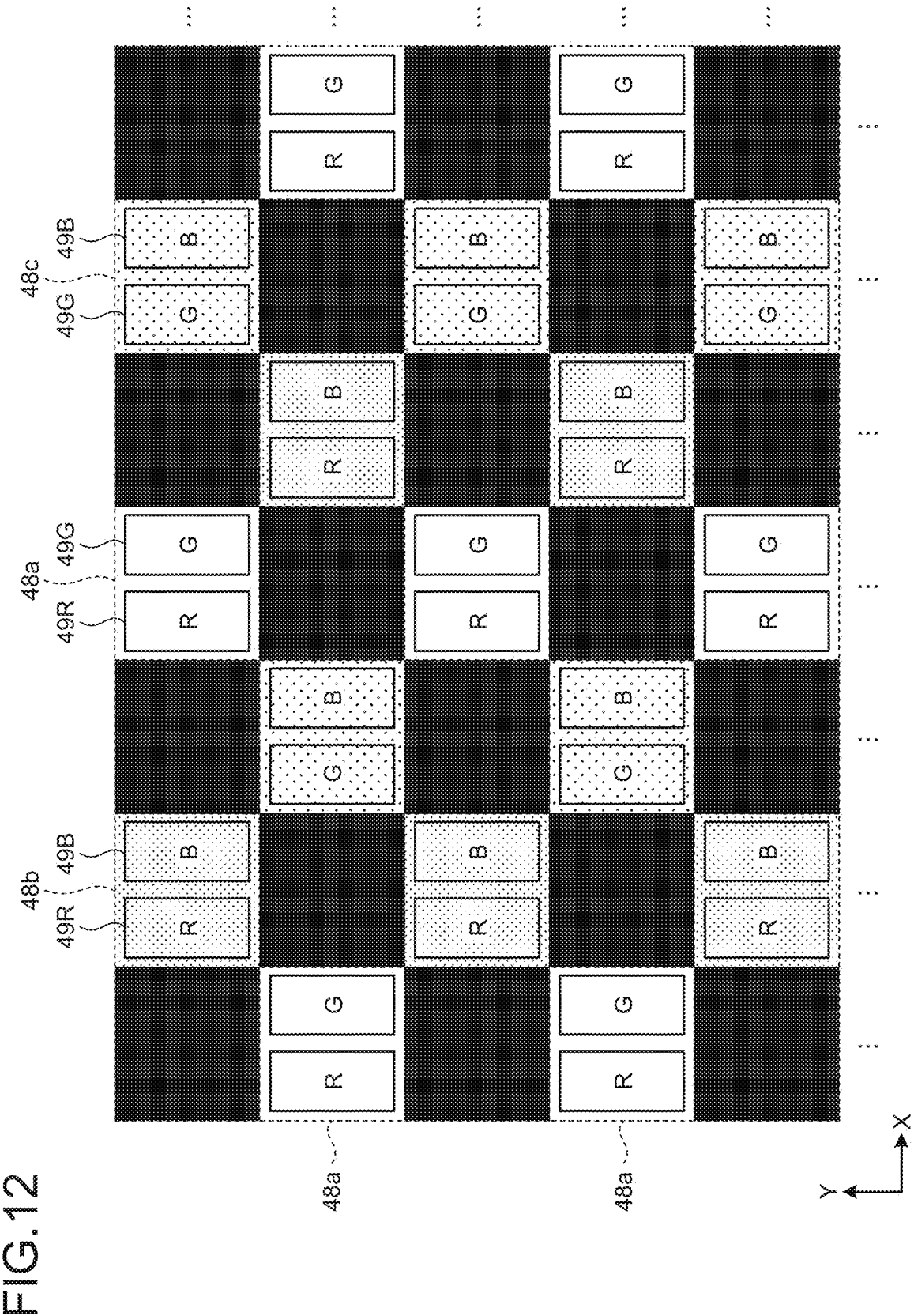
FIG. 12 is a diagram schematically illustrating exemplary display output obtained when the image illustrated in FIG. 8 is received by the display device according to the first embodiment.

FIG. 12 is a diagram schematically illustrating exemplary display output obtained when the image illustrated in FIG. 8 is received by the display device 10 according to the first embodiment. In the configuration according to the first embodiment, the same kinds of pixels 48, that is, the first pixels 48a, the second pixels 48b, and the third pixels 48c are each continuously arrayed in the Y-direction. As a result, the display device 10 according to the first embodiment does not have the arrangement of the pixels 48 that forms the continuous zigzag patterns in the first comparative example (refer to FIG. 4). Consequently, the display device 10 according to the first embodiment prevents the zigzag patterns including inclinations in the oblique directions intersecting the X-direction and the Y-direction from being visually recognized in display output corresponding to the checkered input image illustrated in FIG. 8.

The following describes the signal processor 20. The signal processor 20 calculates output gradation values of the respective sub-pixels 49 based on the gradation values of the three colors included in the input signals for the respective pixels 48. The signal processor 20 outputs signals for causing the image display panel 40 to perform display output corresponding to the output gradation values, as output signals.

If the gradation value of a color included in the input signal for one pixel 48 of two pixels 48 adjacent to each other is larger than the gradation value of the color included in the input signal for the other pixel 48 thereof, the signal processor 20 calculates the output gradation value of the sub-pixel 49 of the color included in the one pixel 48 based on Expression (1). Out(n) included in Expression (1) and Expression (2), which will be described later, is the output gradation value of the sub-pixel 49 of the color included in the one pixel 48. In(n) is the gradation value of the color included in the input signal for the one pixel 48. In(m) is the gradation value of the color included in the input signal for the other pixel 48. "a" in Expression (1) is a predetermined coefficient.

$$\text{Out}(n)=\text{In}(n)-(\text{In}(n)-\text{In}(m))\times a \quad (1)$$

If the gradation value of a color included in the input signal for the one pixel 48 of the two pixels 48 adjacent to each other is smaller than the gradation value of the color included in the input signal for the other pixel 48, the signal processor 20 calculates the output gradation value of the sub-pixel 49 of the color included in the one pixel 48 based on Expression (2). "b" in Expression (2) is a predetermined coefficient. "a" in Expression (1) and "b" in Expression (2) satisfy a<b.

$$\text{Out}(n)=\text{In}(n)+(\text{In}(m)+\text{In}(n))\times b \quad (2)$$

The "two pixels adjacent to each other" indicate a certain pixel 48 and another pixel 48 adjacent to the certain pixel 48 in the X-direction or an oblique direction intersecting the X-direction and the Y-direction. The following describes the contents of specific processing performed when Expressions (1) and (2) are applied to the first pixel 48a, the second pixel 48b, and the third pixel 48c.

FIG. 13 is a diagram schematically illustrating the relation between the first pixels 48a and the pixels 48 adjacent to the first pixels 48a. In the description with reference to FIG. 13 and FIGS. 14 and 15, which will be described later, the number of pixels 48 in the X-direction in the image display panel 40 is w (w>6). In the following description, the image display panel 40 has a rectangular display region (refer to FIG. 1) provided with a plurality of pixels 48, and the positions of the pixels 48 are expressed using a coordinate system the origin point of which corresponds to the position of the pixel 48 disposed at one (upper left in FIG. 1) of the four corners of the rectangle. In the coordinate system, n is a numerical value indicating the position of a certain pixel 48 (reference pixel). In the coordinate system, R(n) is the coordinates of the first sub-pixel 49R included in the reference pixel. G(n) is the coordinates of the second sub-pixel 49G included in the reference pixel. B(n) is the coordinates of the third sub-pixel 49B included in the reference pixel. n−1 is a numerical value indicating the coordinates of the pixel 48 disposed on the first end side in the X-direction with respect to the reference pixel. n+1 is a numerical value indicating the coordinates of the pixel 48 disposed on the second end side in the X-direction with respect to the reference pixel. n−w is a numerical value indicating the coordinates of the pixel 48 disposed on the first end side in the Y-direction with respect to the reference pixel. n+w is a numerical value indicating the coordinates of the pixel 48 disposed on the second end side in the Y-direction with respect to the reference pixel.

The gradation value (RGB data) included in the input signal for the reference pixel is hereinafter expressed by (Rin(n), Gin(n), Bin(n)). The output gradation value for the reference pixel having a form of RGB data is expressed by (Rout(n), Gout(n), Bout(n)). The gradation values of the input signals and the output gradation values for the other pixels 48 are expressed by applying the respective numerical values indicated by the coordinate system described above to the gradation value of the input signal and the output gradation value for the reference pixel.

The first pixel 48a serving as the reference pixel in FIG. 13, for example, includes the first sub-pixel 49R and the second sub-pixel 49G. By contrast, the second pixel 48b adjacent to the first pixel 48a includes no second sub-pixel 49G. The signal processor 20 allocates, to the second sub-pixel 49G included in the first pixel 48a adjacent to the second pixel 48b, the green component corresponding to the second sub-pixel 49G not included in the second pixel 48b out of the color components of the input signal for the second pixel 48b. Specifically, the signal processor 20 determines the first pixel 48*a* serving as the reference pixel to be the one pixel 48 of the two pixels and determines the second pixel 48*b* adjacent to the reference pixel to be the other pixel 48 thereof, for example. The signal processor 20 compares the green component (Gin(n)) of the input signal for the one pixel 48 with the green component (e.g., Gin (n+1)) of the input signal for the other pixel 48. If the green component (Gin(n)) of the input signal for the one pixel 48 is larger than the green component (e.g., Gin(n+1)) of the input signal for the other pixel 48, Expression (3) is derived based on Expression (1). By contrast, if the green component (Gin(n)) of the input signal for the one pixel 48 is smaller than that for the other pixel 48, Expression (4) is derived based on Expression (2). The signal processor 20 determines the green component (Gout(n)) in the output gradation value of the one pixel 48 based on Expression (3) or (4), for example.

$$\text{Gout}(n)=\text{Gin}(n)-(\text{Gin}(n)-\text{Gin}(n+1))\times a \tag{3}$$

$$\text{Gout}(n)=\text{Gin}(n)+(\text{Gin}(n+1)-\text{Gin}(n))\times b \tag{4}$$

The two pixels 48 to be subjected to the allocation of the component may be adjacent to each other in a diagonal direction. The green component of the input signal for the other pixel 48 may be "Gin(n+w+1)" or "Gin(n−w+1)". If the green component of the input signal for the other pixel 48 is "Gin(n+w+1)", the signal processor 20 determines the green component (Gout(n)) in the output gradation value of the one pixel 48 based on Expression (5) or (6). If the green component of the input signal for the other pixel 48 is "Gin(n−w+1)", the signal processor 20 determines the green component (Gout(n)) in the output gradation value of the one pixel 48 based on Expression (7) or (8).

$$\text{Gout}(n)=\text{Gin}(n)-(\text{Gin}(n)-\text{Gin}(n+w+1))\times a \tag{5}$$

$$\text{Gout}(n)=\text{Gin}(n)+(\text{Gin}(n+w+1)-\text{Gin}(n))\times b \tag{6}$$

$$\text{Gout}(n)=\text{Gin}(n)-(\text{Gin}(n)-\text{Gin}(n-w+1))\times a \tag{7}$$

$$\text{Gout}(n)=\text{Gin}(n)+(\text{Gin}(n-w+1)-\text{Gin}(n))\times b \tag{8}$$

The third pixel 48*c* adjacent to the first pixel 48*a* includes no first sub-pixel 49R. The signal processor 20 allocates, to the first sub-pixel 49R included in the first pixel 48*a* adjacent to the third pixel 48*c*, the red component corresponding to the first sub-pixel 49R not included in the third pixel 48*c* out of the color components of the input signal for the third pixel 48*c*. Specifically, the signal processor 20 determines the first pixel 48*a* serving as the reference pixel to be the one pixel 48 and determines the third pixel 48*c* adjacent to the reference pixel to be the other pixel 48, for example. The signal processor 20 compares the red component (Rin(n)) of the input signal for the one pixel 48 with the red component (e.g., Rin(n−1)) of the input signal for the other pixel 48. If the red component (Rin(n)) of the input signal for the one pixel 48 is larger than the red component (e.g., Rin(n-1)) of the input signal for the other pixel 48, Expression (9) is derived based on Expression (1). By contrast, if the red component (Rin(n)) of the input signal for the one pixel 48 is smaller than that for the other pixel 48, Expression (10) is derived based on Expression (2). The signal processor 20 determines the red component (Rout(n)) in the output gradation value of the one pixel 48 based on Expression (9) or (10), for example.

$$\text{Rout}(n)=\text{Rin}(n)-(\text{Rin}(n)-\text{Rin}(n-1))\times a \tag{9}$$

$$\text{Rout}(n)=\text{Rin}(n)+(\text{Rin}(n-1)-\text{Rin}(n))\times b \tag{10}$$

The two pixels 48 to be subjected to the allocation of the component may be adjacent to each other in a diagonal direction. The red component of the input signal for the other pixel 48 may be "Rin(n+w−1)" or "Rin(n−w−1)". If the red component of the input signal for the other pixel 48 is "Rin(n+w−1)", the signal processor 20 determines the red component (Rout(n)) in the output gradation value of the one pixel 48 based on Expression (11) or (12). If the red component of the input signal for the other pixel 48 is "Rin(n−w−1)", the signal processor 20 determines the red component (Rout(n)) in the output gradation value of the one pixel 48 based on Expression (13) or (14).

$$\text{Rout}(n)=\text{Rin}(n)-(\text{Rin}(n)-\text{Rin}(n+w-1))\times a \tag{11}$$

$$\text{Rout}(n)=\text{Rin}(n)+(\text{Rin}(n+w-1)-\text{Rin}(n))\times b \tag{12}$$

$$\text{Rout}(n)=\text{Rin}(n)-(\text{Rin}(n)-\text{Rin}(n-w-1))\times a \tag{13}$$

$$\text{Rout}(n)=\text{Rin}(n)+(\text{Rin}(n-w-1)-\text{Rin}(n))\times b \tag{14}$$

The first pixel 48*a* includes no third sub-pixel 49B. If the first pixel 48*a* serves as the reference pixel, the blue component (Bout(n)) in the output gradation value of the first pixel 48*a* is not calculated. The blue component (Bin(n)) of the input signal for the first pixel 48*a* is allocated to at least one of the third sub-pixels 49B included in other pixels 48 (e.g., the second pixel 48*b* and the third pixel 48*c*) adjacent to the first pixel 48*a*.

Figure 14:
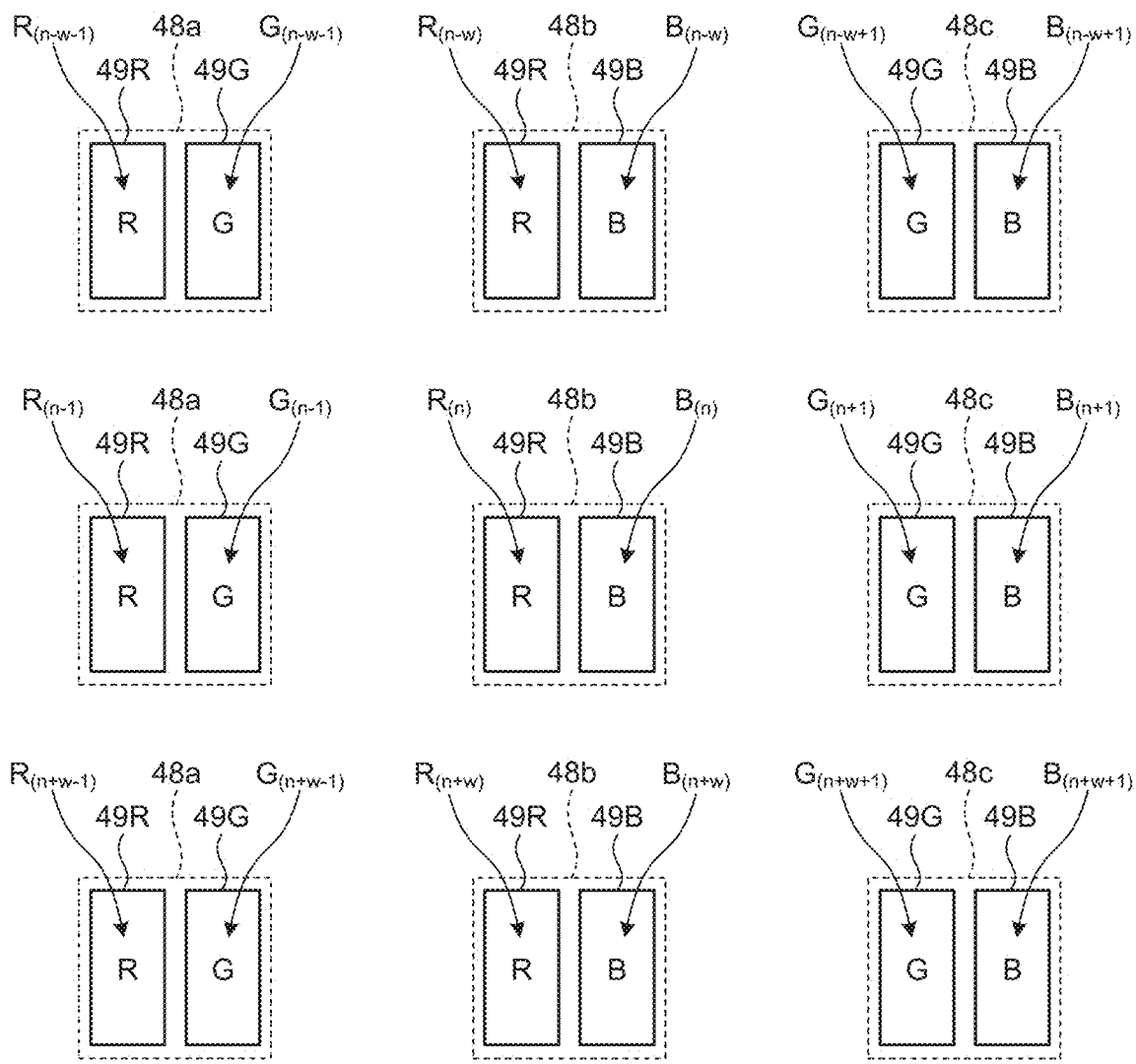
FIG. 14 is a diagram schematically illustrating the relation between second pixels and pixels adjacent to the second pixels.

FIG. 14 is a diagram schematically illustrating the relation between the second pixels 48*b* and the pixels 48 adjacent to the second pixels 48*b*. The second pixel 48*b* serving as the reference pixel in FIG. 14 includes the first sub-pixel 49R and the third sub-pixel 49B. By contrast, the first pixel 48*a* adjacent to the second pixel 48*b* includes no third sub-pixel 49B. The signal processor 20 allocates, to the third sub-pixel 49B included in the second pixel 48*b* adjacent to the first pixel 48*a*, the blue component corresponding to the third sub-pixel 49B not included in the first pixel 48*a* out of the color components of the input signal for the first pixel 48*a*. Specifically, the signal processor 20 determines the second pixel 48*b* serving as the reference pixel to be the one pixel 48 and determines the first pixel 48*a* adjacent to the reference pixel to be the other pixel 48, for example. The signal processor 20 compares the blue component (Bin(n)) of the input signal for the one pixel 48 with the blue component (e.g., Bin(n−1)) of the input signal for the other pixel 48. If the blue component (Bin(n)) of the input signal for the one pixel 48 is larger than the blue component (e.g., Bin(n−1)) of the input signal for the other pixel 48, Expression (15) is derived based on Expression (1). By contrast, if the blue component (Bin(n)) of the input signal for the one pixel 48 is smaller than that for the other pixel 48, Expression (16) is derived based on Expression (2). The signal processor 20 determines the blue component (Bout(n)) in the output gradation value of the one pixel 48 based on Expression (15) or (16), for example.

$$\text{Bout}(n)=\text{Bin}(n)-(\text{Bin}(n)-\text{Bin}(n-1))\times a \tag{15}$$

$$\text{Bout}(n)=\text{Bin}(n)+(\text{Bin}(n-1)-\text{Bin}(n))\times b \tag{16}$$

The two pixels 48 to be subjected to the allocation of the component may be adjacent to each other in a diagonal direction. The blue component of the input signal for the other pixel 48 may be "Bin(n+w−1)" or "Bin(n−w−1)". If the blue component of the input signal for the other pixel 48 is "Bin(n+w−1)", the signal processor 20 determines the blue component (Bout(n)) in the output gradation value of the one pixel 48 based on Expression (17) or (18). If the blue component of the input signal for the other pixel 48 is "Bin(n−w−1)", the signal processor 20 determines the blue component (Bout(n)) in the output gradation value of the one pixel 48 based on Expression (19) or (20).

$$Bout(n)=Bin(n)-(Bin(n)-Bin(n+w-1))\times a \quad (17)$$

$$Bout(n)=Bin(n)+(Bin(n+w-1)-Bin(n))\times b \quad (18)$$

$$Bout(n)=Bin(n)-(Bin(n)-Bin(n-w-1))\times a \quad (19)$$

$$Bout(n)=Bin(n)+(Bin(n-w-1)-Bin(n))\times b \quad (20)$$

The third pixel 48c adjacent to the second pixel 48b includes no first sub-pixel 49R. The signal processor 20 allocates, to the first sub-pixel 49R included in the second pixel 48b adjacent to the third pixel 48c, the red component corresponding to the first sub-pixel 49R not included in the third pixel 48c out of the color components of the input signal for the third pixel 48c. Specifically, the signal processor 20 determines the second pixel 48b serving as the reference pixel to be the one pixel 48 and determines the third pixel 48c adjacent to the reference pixel to be the other pixel 48, for example. The signal processor 20 compares the red component (Rin(n)) of the input signal for the one pixel 48 with the red component (e.g., Rin(n+1)) of the input signal for the other pixel 48. If the red component (Rin(n)) of the input signal for the one pixel 48 is larger than the red component (e.g., Rin(n+1)) of the input signal for the other pixel 48, Expression (21) is derived based on Expression (1). By contrast, if the red component (Rin(n)) of the input signal for the one pixel 48 is smaller than that for the other pixel 48, Expression (22) is derived based on Expression (2). The signal processor 20 determines the red component (Rout(n)) in the output gradation value of the one pixel 48 based on Expression (21) or (22), for example.

$$Rout(n)=Rin(n)-(Rin(n)-Rin(n+1))\times a \quad (21)$$

$$Rout(n)=Rin(n)+(Rin(n+1)-Rin(n))\times b \quad (22)$$

The two pixels 48 to be subjected to the allocation of the component may be adjacent to each other in a diagonal direction. The red component of the input signal for the other pixel 48 may be "Rin(n+w+1)" or "Rin(n−w+1)". If the red component of the input signal for the other pixel 48 is "Rin(n+w+1)", the signal processor 20 determines the red component (Rout(n)) in the output gradation value of the one pixel 48 based on Expression (23) or (24). If the red component of the input signal for the other pixel 48 is "Rin(n−w+1)", the signal processor 20 determines the red component (Rout(n)) in the output gradation value of the one pixel 48 based on Expression (25) or (26).

$$Rout(n)=Rin(n)-(Rin(n)-Rin(n+w+1))\times a \quad (23)$$

$$Rout(n)=Rin(n)+(Rin(n+w+1)-Rin(n))\times b \quad (24)$$

$$Rout(n)=Rin(n)-(Rin(n)-Rin(n-w+1))\times a \quad (25)$$

$$Rout(n)=Rin(n)+(Rin(n-w+1)-Rin(n))\times b \quad (26)$$

The second pixel 48b includes no second sub-pixel 49G. If the second pixel 48b serves as the reference pixel, the green component (Gout(n)) in the output gradation value of the second pixel 48b is not calculated. The green component (Gin(n)) of the input signal for the second pixel 48b is allocated to at least one of the second sub-pixels 49G included in other pixels 48 (e.g., the first pixel 48a and the third pixel 48c) adjacent to the second pixel 48b.

FIG. 15 is a diagram schematically illustrating the relation between the third pixels 48c and the pixels 48 adjacent to the third pixels 48c. The third pixel 48c serving as the reference pixel in FIG. 15 includes the second sub-pixel 49G and the third sub-pixel 49B. By contrast, the first pixel 48a adjacent to the third pixel 48c includes no third sub-pixel 49B. The signal processor 20 allocates, to the third sub-pixel 49B included in the third pixel 48c adjacent to the first pixel 48a, the blue component corresponding to the third sub-pixel 49B not included in the first pixel 48a out of the color components of the input signal for the first pixel 48a. Specifically, the signal processor 20 determines the third pixel 48c serving as the reference pixel to be the one pixel 48 and determines the first pixel 48a adjacent to the reference pixel to be the other pixel 48, for example. The signal processor 20 compares the blue component (Bin(n)) of the input signal for the one pixel 48 with the blue component (e.g., Bin(n+1)) of the input signal for the other pixel 48. If the blue component (Bin(n)) of the input signal for the one pixel 48 is larger than the blue component (e.g., Bin(n+1)) of the input signal for the other pixel 48, Expression (27) is derived based on Expression (1). By contrast, if the blue component (Bin(n)) of the input signal for the one pixel 48 is smaller than that for the other pixel 48, Expression (28) is derived based on Expression (2). The signal processor 20 determines the blue component (Bout(n)) in the output gradation value of the one pixel 48 based on Expression (27) or (28), for example.

$$Bout(n)=Bin(n)-(Bin(n)-Bin(n+1))\times a \quad (27)$$

$$Bout(n)=Bin(n)+(Bin(n+1)-Bin(n))\times b \quad (28)$$

The two pixels 48 to be subjected to the allocation of the component may be adjacent to each other in a diagonal direction. The blue component of the input signal for the other pixel 48 may be "Bin(n+w+1)" or "Bin(n−w+1)". If the blue component of the input signal for the other pixel 48 is "Bin(n+w+1)", the signal processor 20 determines the blue component (Bout(n)) in the output gradation value of the one pixel 48 based on Expression (29) or (30). If the blue component of the input signal for the other pixel 48 is "Bin(n−w+1)", the signal processor 20 determines the blue component (Bout(n)) in the output gradation value of the one pixel 48 based on Expression (31) or (32).

$$Bout(n)=Bin(n)-(Bin(n)-Bin(n+w+1))\times a \quad (29)$$

$$Bout(n)=Bin(n)+(Bin(n+w+1)-Bin(n))\times b \quad (30)$$

$$Bout(n)=Bin(n)-(Bin(n)-Bin(n-w+1))\times a \quad (31)$$

$$Bout(n)=Bin(n)+(Bin(n-w+1)-Bin(n))\times b \quad (32)$$

The second pixel 48b adjacent to the third pixel 48c includes no second sub-pixel 49G. The signal processor 20 allocates, to the second sub-pixel 49G included in the third pixel 48c adjacent to the second pixel 48b, the green component corresponding to the second sub-pixel 49G not included in the second pixel 48b out of the color components of the input signal for the second pixel 48b. Specifically, the signal processor 20 determines the third pixel 48c serving as the reference pixel to be the one pixel 48 and determines the second pixel 48b adjacent to the reference pixel to be the other pixel 48, for example. The signal processor 20 compares the green component (Gin(n)) of the input signal for the one pixel 48 with the green component (e.g., Gin(n−1)) of the input signal for the other pixel 48. If the green component (Gin(n)) of the input signal for the one pixel 48 is larger than the green component (e.g., Gin(n−1)) of the input signal for the other pixel 48, Expression (33) is derived based on Expression (1). By contrast, if the green component (Gin(n)) of the input signal for the one pixel 48 is smaller, Expression (34) is derived based on Expression (2). The signal processor 20 determines the green component (Gout(n)) in the output gradation value of the one pixel 48 based on Expression (33) or (34), for example.

$$Gout(n)=Gin(n)-(Gin(n)-Gin(n-1))\times a \quad (33)$$

$$Gout(n)=Gin(n)+(Gin(n-1)-Gin(n))\times b \quad (34)$$

The two pixels 48 to be subjected to the allocation of the component may be adjacent to in a diagonal direction. The green component of the input signal for the other pixel 48 may be "Gin(n+w−1)" or "Gin(n−w−1)". If the green component of the input signal for the other pixel 48 is "Gin(n+w−1)", the signal processor 20 determines the green component (Gout(n)) in the output gradation value of the one pixel 48 based on Expression (35) or (36). If the green component of the input signal for the other pixel 48 is "Gin(n−w−1)", the signal processor 20 determines the green component (Gout(n)) in the output gradation value of the one pixel 48 based on Expression (37) or (38).

$$Gout(n)=Gin(n)-(Gin(n)-Gin(n+w-1))\times a \quad (35)$$

$$Gout(n)=Gin(n)+(Gin(n+w-1)-Gin(n))\times b \quad (36)$$

$$Gout(n)=Gin(n)-(Gin(n)-Gin(n-w-1))\times a \quad (37)$$

$$Gout(n)=Gin(n)+(Gin(n-w-1)-Gin(n))\times b \quad (38)$$

As described above, if a color component of one color not allocated to two sub-pixels 49 included in one pixel 48 is received, the signal processor 20 allocates the color component to at least one of the sub-pixels 49 of the one color included in other pixels 48 adjacent to the one pixel 48. With the allocation performed by the signal processor 20 described above, the first embodiment can prevent or reduce display output that causes colored patterns not included in an input image to be visually recognized. The following describes the relation between the display device 10 and colored patterns not included in an input image with reference to FIGS. 16 to 21.

Figure 16:
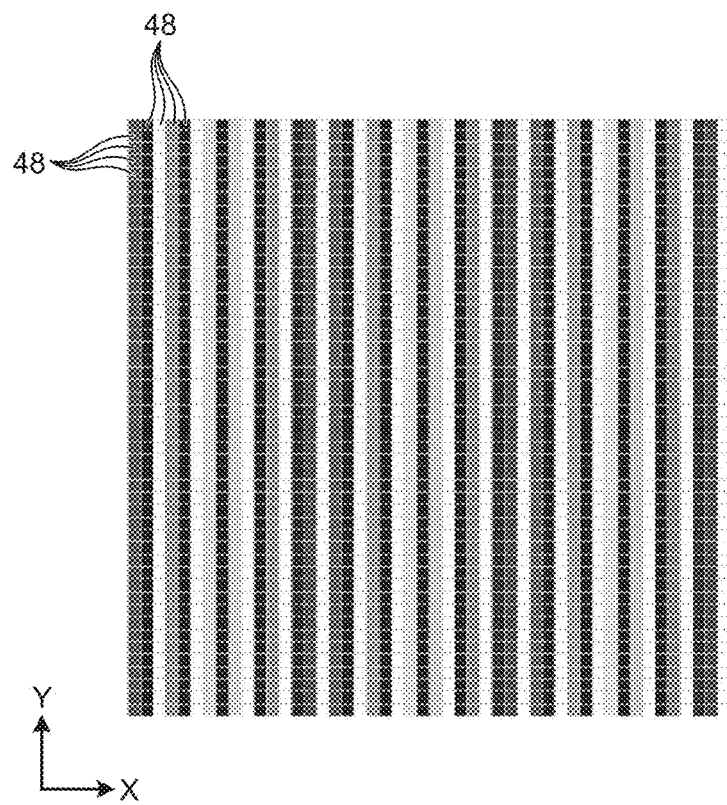
FIG. 16 is a diagram of a schematic example of a stripe gray-scale image including intermediate gradations.
Figure 17:
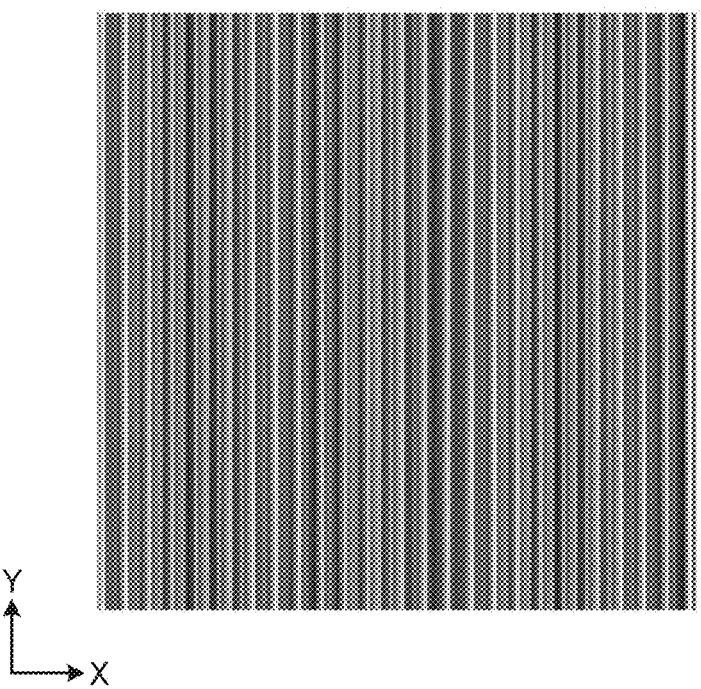
FIG. 17 is a diagram of an image of exemplary display output obtained when the image illustrated in FIG. 16 is received by a display device including the sub-pixels disposed such that a first sub-pixel, a second sub-pixel, and a third sub-pixel are repeatedly arranged in this order from a first end side to a second end side in the X-direction.

FIG. 16 is a diagram of a schematic example of a stripe gray-scale image including intermediate gradations. FIG. 17 is a diagram of an image of exemplary display output obtained when the image illustrated in FIG. 16 is received by a display device including the sub-pixels 49 disposed such that the first sub-pixel 49R, the second sub-pixel 49G, and the third sub-pixel 49B are repeatedly arranged in this order from the first end side to the second end side in the X-direction of the image display surface. In the display device including the sub-pixels 49 disposed such that the first sub-pixel 49R, the second sub-pixel 49G, and the third sub-pixel 49B are repeatedly arranged in this order from the first end side to the second end side in the X-direction like the first comparative example, unintended coloring may possibly occur. FIG. 17 does not illustrate color information other than the brightness. In actual output, however, stripes of colors, such as cyan (C), magenta (M), and yellow (Y), not supposed to be output in the gray scale image are visually recognized.

Figure 18:
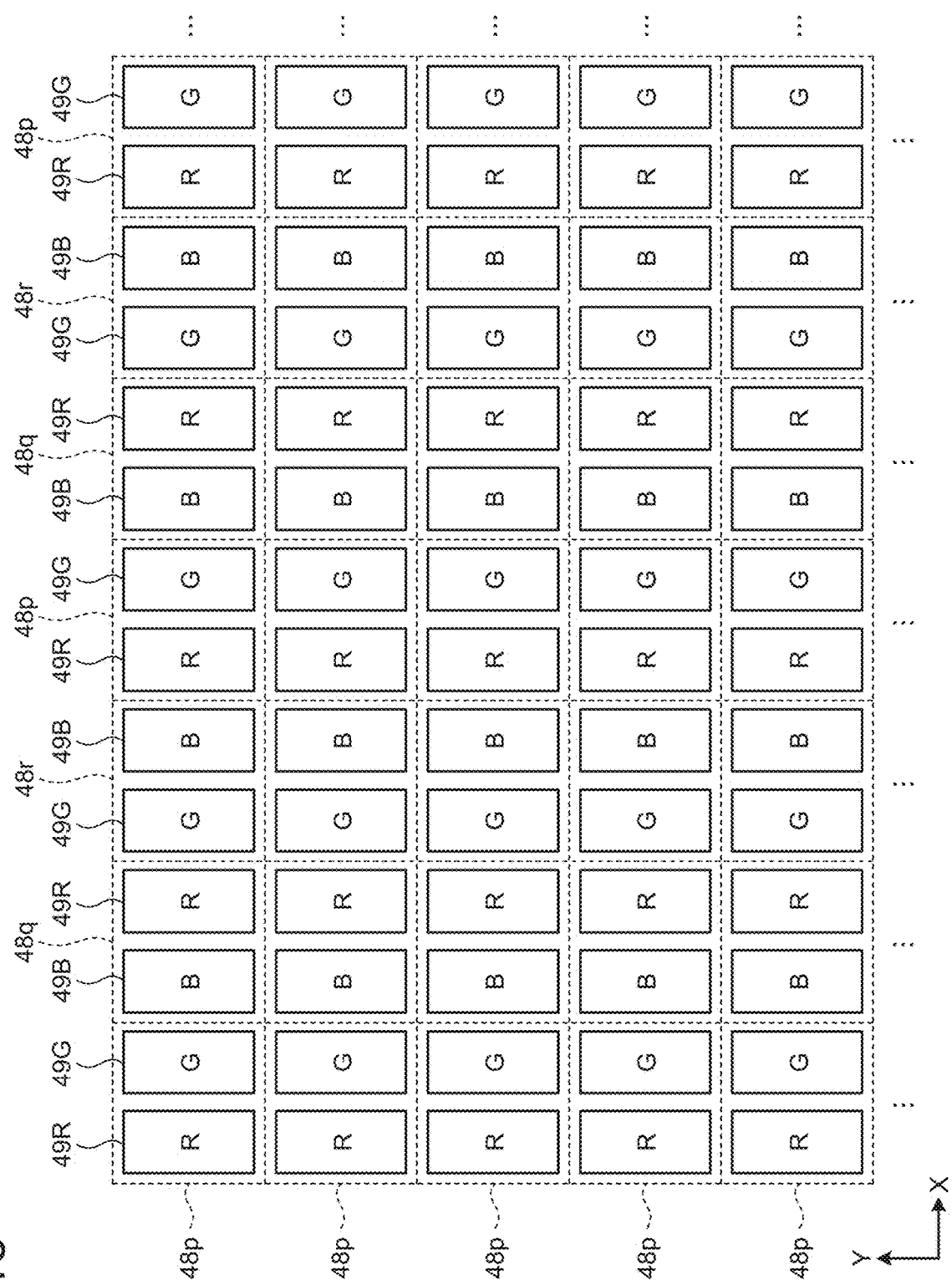
FIG. 18 is a diagram of an exemplary arrangement of the pixels and the sub-pixels according to a second comparative example.

FIG. 18 is a diagram of an exemplary arrangement of the pixels and the sub-pixels 49 according to a second comparative example. As with the first comparative example, the display device illustrated in FIG. 18 includes the sub-pixels 49 disposed such that the first sub-pixel 49R, the second sub-pixel 49G, and the third sub-pixel 49B are repeatedly arranged in this order from the first end side to the second end side in the X-direction of the image display surface. In the display device illustrated in FIG. 18, the seventh pixels 48p, the eighth pixels 48q, and the ninth pixels 48r are each continuously arrayed in the Y-direction. Consequently, the sub-pixels 49 of the same color are continuously arrayed in terms of the colors of the sub-pixels 49 (the first sub-pixel 49R, the second sub-pixel 49G, and the third sub-pixel 49B) and the arrangement in the Y-direction.

FIG. 19 is a diagram of patterns of the input signals that cause coloring in the second comparative example. A pattern 1 to a pattern 3 illustrated in FIG. 19 are obtained when RGB data indicating red (R), green (G), and blue (B) by 8-bit gradation values are received as the input signals. FIG. 19 illustrates part (six pixels) of one row out of the input signals of the stripe gray scale image. The pattern 1 indicates a case where RGB data of (R,G,B)=(255,255,255), (205,205,205), (0,0,0), (200,200,200), (255,255,255), and (0,0,0) is received for a pixel closer to the first end side in the X-direction to a pixel close to the second end side, respectively. The pattern 2 indicates a case where RGB data of (R,G,B)=(0,0,0), (250,250,250), (210,210,210), (0,0,0), (190,190,190), and (255,255,255) is received for the pixel closer to the first end side in the X-direction to the pixel closer to the second end side, respectively. The pattern 3 indicates a case where RGB data of (R,G,B)=(0,0,0), (0,0,0), (245,245,245), (215,215,215), (0,0,0), and (190,190,190) is received for the pixel closer to the first end side in the X-direction to the pixel closer to the second end side, respectively.

FIG. 20 is a diagram schematically illustrating a mechanism that causes coloring when the second comparative example illustrated in FIG. 18 performs display output based on the input signals illustrated in FIG. 19. FIG. 20 simply illustrates a case where Expressions (3) to (38) are applied to the second comparative example for comparison with the first embodiment only. FIG. 20 is not intended to indicate that the first comparative example performs the allocation. While FIG. 20, FIG. 21, and other figures, which will be described later, illustrate an example of allocation in which a=0.197 and b=0.58 are satisfied, this is given by way of example only. The values of a and b are not limited thereto and may be appropriately changed as long as they satisfy a<b. In FIG. 20, FIG. 21, and other figures, which will be described later, the output gradation values of the patterns 1 and 3 are calculated assuming that an input signal for a pixel 48 positioned closer to the first end side in the X-direction than the pixel 48 closest to the first end side out of the six pixels 48 illustrated in FIG. 19 is (R,G,B)=(0,0,0). In FIG. 20, FIG. 21, and other figures, which will be described later, the output gradation values of the patterns 1 and 3 are calculated assuming that an input signal for a pixel 48 positioned closer to the second end side in the X-direction than the pixel 48 closest to the second end side out of the six pixels 48 illustrated in FIG. 19 is (R,G,B)=(125,125,125). In FIG. 20, FIG. 21, and other figures, which will be described later, the output gradation values of the pattern 2 are calculated assuming that the input signal for the pixel 48 positioned closer to the first end side in the X-direction than the pixel 48 closest to the the first end side out of the six pixels 48 illustrated in FIG. 19 is (R,G,B)=(135,135,135). In FIG. 20, FIG. 21, and other figures, which will be described later, the output gradation values of the pattern 2 are calculated assuming that the input signal for the pixel 48 positioned closer to the second end side in the X-direction than the pixel 48 closest to the second end side out of the six pixels 48 illustrated in FIG. 19 is (R,G,B)=(0,0,0).

When the pattern 1 illustrated in FIG. 19 is received, gradation values of (R,G,B)=(205,245,-), (165,-,234), (-,119,116), (161,232,-), (205,-,244), and (-,148,73) are calculated as the output gradation values for the six pixels, respectively, that is, the output gradation values for the pixel closer to the first end side in the X-direction to the pixel closer to the second end side as illustrated in FIG. 20. In the second comparative example, the second sub-pixel 49G of the seventh pixel 48p and the third sub-pixel 49B of the eighth pixel 48q are adjacent to each other in the X-direction. As a result, cyan (C), which is a combination color of green (G) and blue (B), is visually recognized in display output corresponding to "G=245" of the seventh pixel 48p and "B=234" of the eighth pixel 48q having relatively large gradation values out of (R,G,B)=(205,245,-) and (165,-,234). Cyan (C) is also visually recognized in display output corresponding to "G=232" of the seventh pixel 48p and "B=244" of the eighth pixel 48q having relatively large gradation values out of (R,G,B)=(161,232,-) and (205,-,244).

When the pattern 2 illustrated in FIG. 19 is received, gradation values of (R,G,B)=(78,145,-), (242,-,201), (-,233,169), (122,110,-), (228,-,153), and (-,242,205) are calculated as the output gradation values for the six pixels, respectively, that is, the output gradation values for the pixel closer to the first end side in the X-direction to the pixel closer to the second end side as illustrated in FIG. 20. In the second comparative example, the first sub-pixel 49R of the eighth pixel 48q and the second sub-pixel 49G of the ninth pixel 48r are adjacent to each other in the X-direction. As a result, yellow (Y), which is a combination color of red (R) and green (G), is visually recognized in display output corresponding to "R=242" of the eighth pixel 48q and "G=233" of the ninth pixel 48r having relatively large gradation values out of (R,G,B)=(242,-,201) and (-,233,169). Yellow (Y) is also visually recognized in display output corresponding to "R=228" of the eighth pixel 48q and "G=242" of the ninth pixel 48r having relatively large gradation values out of (R,G,B)=(228,-,153) and (-,242,205).

When the pattern 3 illustrated in FIG. 19 is received, gradation values of (R,G,B)=(0,0,-), (142,-,0), (-,197,239), (232,173,-), (110,-,125), and (-,153,177) are calculated as the output gradation values for the six pixels, respectively, that is, the output gradation values for the pixel closer to the first end side in the X-direction to the pixel closer to the second end side as illustrated in FIG. 20. In the second comparative example, the third sub-pixel 49B of the ninth pixel 48r and the first sub-pixel 49R of the seventh pixel 48p are adjacent to each other in the X-direction. As a result, magenta (M), which is a combination color of blue (B) and red (R), is visually recognized in display output corresponding to "B=239" of the ninth pixel 48r and "R=232" of the seventh pixel 48p having relatively large gradation values out of (R,G,B)=(-,197,239) and (232,173,-).

As described above with reference to FIG. 20, the second comparative example may possibly cause colored patterns not included in the input image to be visually recognized. By contrast, the first embodiment can prevent or reduce generation of colored patterns.

FIG. 21 is a diagram of an example of color allocation according to the first embodiment. The output gradation values of the patterns 1 to 3 illustrated in FIG. 21 are the same as those of the patterns 1 to 3 illustrated in FIG. 20. In the configuration according to the first embodiment, the second sub-pixel 49G of the first pixel 48a and the third sub-pixel 49B of the second pixel 48b are not adjacent to each other in the X-direction. Consequently, cyan (C) is prevented from being visually recognized. In the configuration according to the first embodiment, the first sub-pixel 49R of the second pixel 48b and the second sub-pixel 49G of the third pixel 48c are not adjacent to each other in the X-direction. Consequently, yellow (Y) is prevented from being visually recognized.

In the configuration according to the first embodiment, each pixel 48 includes two sub-pixels 49, and the two colors of the two pixels and the positional relation between the two sub-pixels 49 are the same in each of the pixels 48 arrayed in the second direction (e.g., the Y-direction) of the row direction (X-direction) and the column direction (Y-direction). Consequently, the first embodiment can prevent or reduce generation of bright-and-dark patterns not included in an input image. Furthermore, the configuration includes the sub-pixel arrangement in which the sub-pixels 49 having the same color allocated thereto are arranged along the first direction (e.g., the X-direction) with one sub-pixel 49 interposed therebetween, the one sub-pixel 49 having another color allocated thereto. Consequently, the first embodiment can prevent or reduce generation of colored patterns not included in an input image. As described above, the first embodiment can prevent or reduce generation of patterns not included in an input image.

The sub-pixels 49 having any one of two colors out of the three colors of red (R), green (G), and blue (B) allocated thereto are arranged along the first direction (e.g., the X-direction) with one sub-pixel 49 interposed therebetween, the one sub-pixel 49 having the remaining color other than the two colors out of the three colors allocated thereto. In other words, the sub-pixels 49 to which the same color is allocated are not adjacent to each other in the X-direction in the configuration according to the first embodiment. Consequently, the first embodiment can provide higher resolution.

The output gradation values is calculated based on Expressions (1) and (2). Consequently, the output gradation values of the respective sub-pixels 49 can be calculated in a simpler manner based on the uniform expressions.

Figure 22:
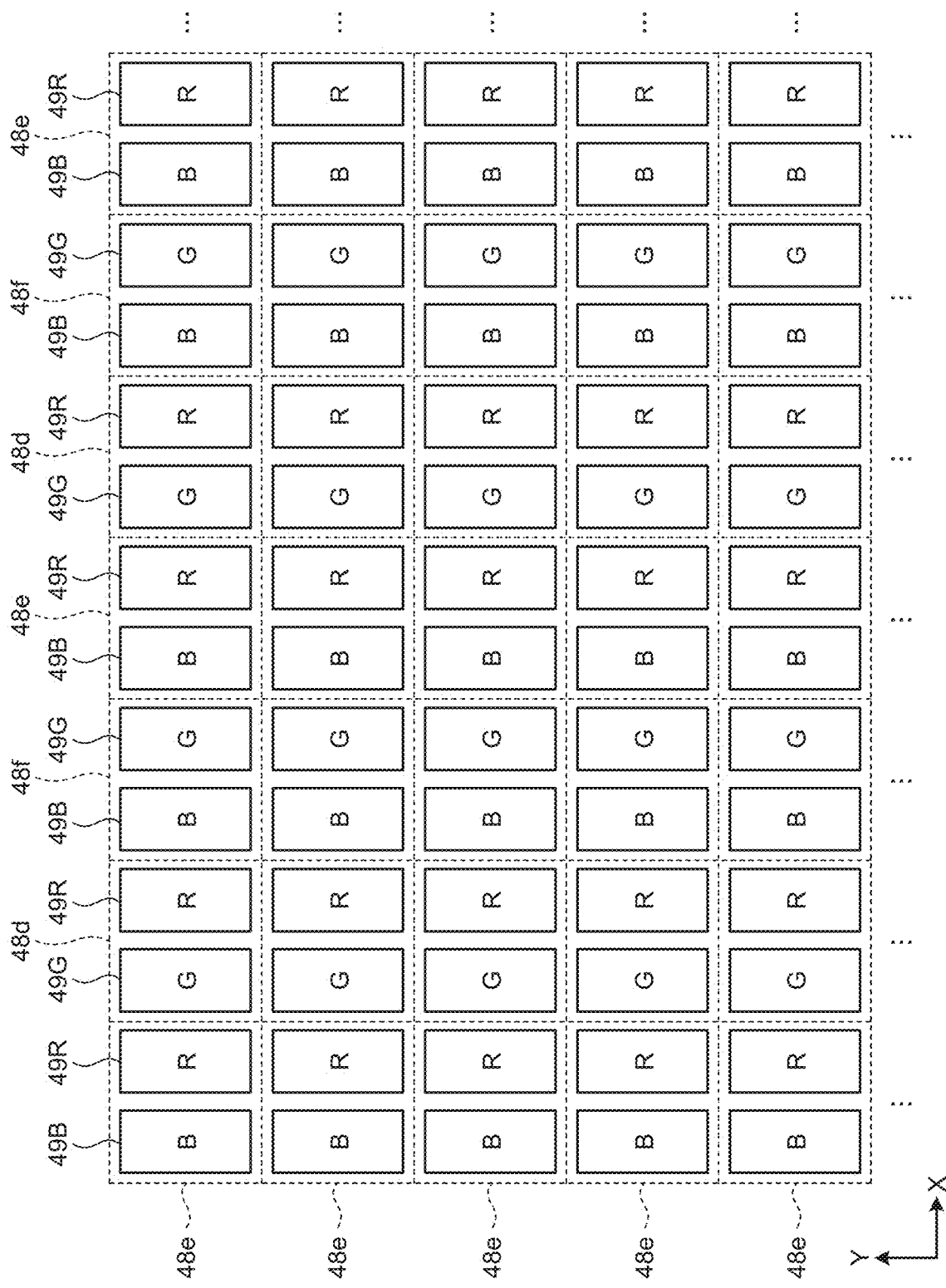
FIG. 22 is a diagram of an example of an arrangement of the pixels and an arrangement of the sub-pixels included in the pixels according to a modification of the first embodiment.

FIG. 22 is a diagram of an example of an arrangement of the pixels 48 and an arrangement of the sub-pixels 49 included in the pixels 48 according to a modification of the first embodiment. Each of the pixels 48 according to the modification of the first embodiment is any one of a fourth pixel 48d, a fifth pixel 48e, and a sixth pixel 48f. The fourth pixel 48d includes the second sub-pixel 49G and the first sub-pixel 49R. In the fourth pixel 48d, the second sub-pixel 49G is disposed relatively on the first end side in the X-direction, and the first sub-pixel 49R is disposed on the second end side. The fifth pixel 48e includes the third sub-pixel 49B and the first sub-pixel 49R. In the fifth pixel 48e, the third sub-pixel 49B is disposed relatively on the first end side in the X-direction, and the first sub-pixel 49R is disposed on the second end side. The sixth pixel 48f includes the third sub-pixel 49B and the second sub-pixel 49G. In the sixth pixel 48f, the third sub-pixel 49B is disposed relatively on the first end side in the X-direction, and the second sub-pixel 49G is disposed on the second end side. The pixels 48 according to the modification of the first embodiment are arrayed in the order of the fifth pixel 48e, the fourth pixel 48d, the sixth pixel 48f, the fifth pixel 48e, the fourth pixel 48d, the sixth pixel 48f, . . . , for example, from the first end side to the second end side in the X-direction of the image display surface 41.

The colors of the sub-pixels 49 included in the fourth pixel 48d, the fifth pixel 48e, and the sixth pixel 48f are the same as those of the first pixel 48a, the second pixel 48b, and the third pixel 48c, respectively. The calculation method (Expressions (3) to (38)) for the output gradation values of the sub-pixels 49 included in the first pixel 48a, the second pixel 48b, and the third pixel 48c described with reference to FIGS. 13 to 15 can be applied to the modification of the first embodiment. The modification of the first embodiment can provide the same advantages as those of the first embodiment.

Second Embodiment

Figure 23:
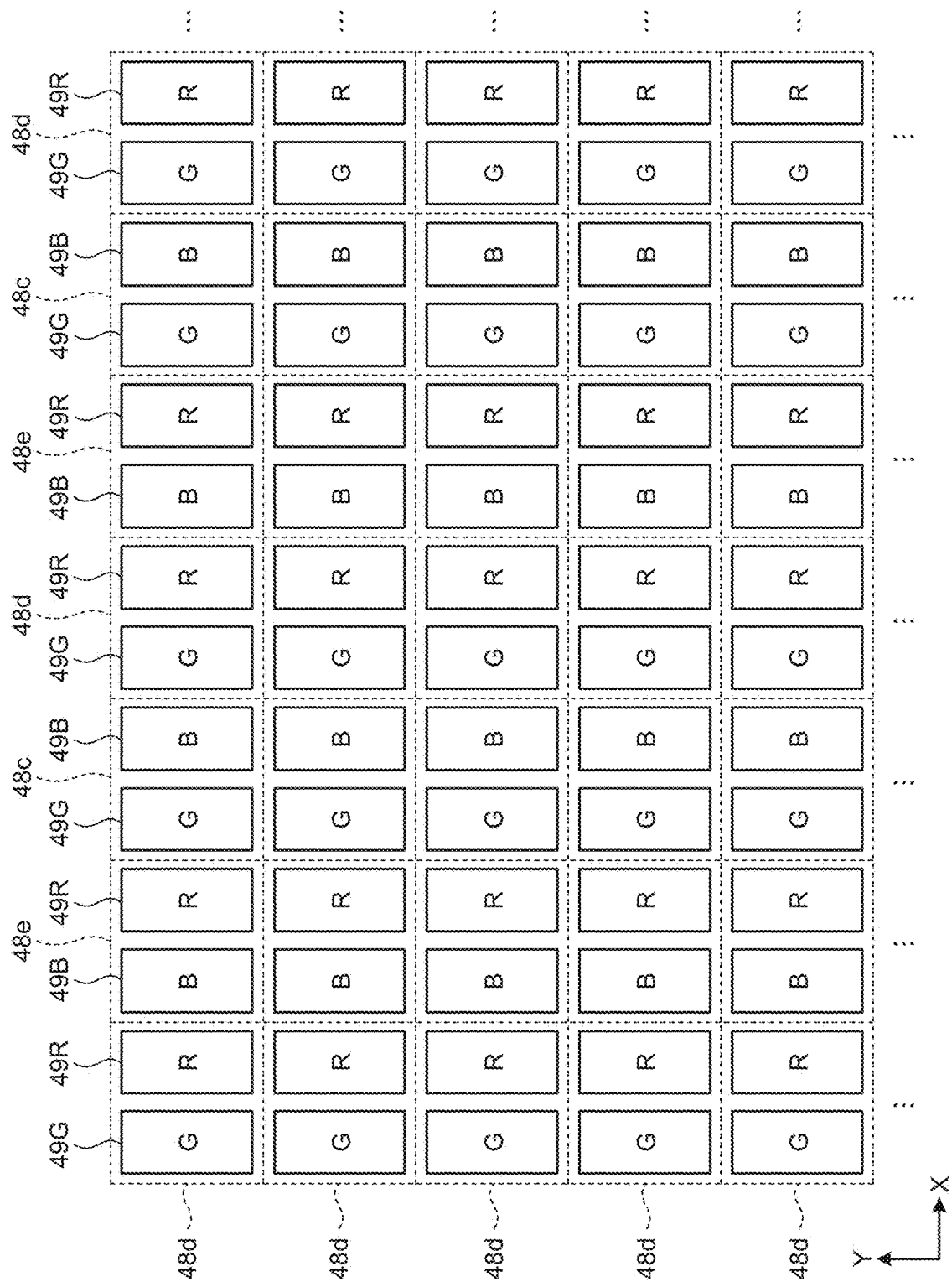
FIG. 23 is a diagram of an example of an arrangement of the pixels and an arrangement of the sub-pixels included in the pixels according to a second embodiment of the present invention.

FIG. 23 is a diagram of an example of an arrangement of the pixels 48 and an arrangement of the sub-pixels 49 included in the pixels 48 according to a second embodiment of the present invention. Each of the pixels 48 according to the second embodiment is any one of the fourth pixel 48d, the fifth pixel 48e, and the third pixel 48c. The pixels 48 according to the second embodiment are arrayed in the order of the fourth pixel 48d, the fifth pixel 48e, the third pixel 48c, the fourth pixel 48d, the fifth pixel 48e, the third pixel 48c, . . . , for example, from the first end side to the second end side in the X-direction of the image display surface. In the configuration according to the second embodiment, sub-pixels 49 to which one of two colors (e.g., red and green) out of the three colors is allocated are arranged along the first direction (e.g., the X-direction) with one sub-pixel 49 interposed therebetween, the one sub-pixel 49 being a sub-pixel to which the remaining color (e.g., blue) other than the two colors out of the three colors is allocated.

FIG. 24 is a diagram of an example of color allocation according to the second embodiment. The output gradation values of the patterns 1 to 3 illustrated in FIG. 24 are the same as those of the patterns 1 to 3 illustrated in FIG. 20. In the configuration according to the second embodiment, the second sub-pixel 49G of the fourth pixel 48d and the third sub-pixel 49B of the fifth pixel 48e are not adjacent to each other in the X-direction. Consequently, cyan (C) is prevented from being visually recognized. In the configuration according to the second embodiment, the third sub-pixel 49B of the third pixel 48c and the first sub-pixel 49R of the fourth pixel 48d are not adjacent to each other in the X-direction. Consequently, magenta (M) is prevented from being visually recognized. The display device according to the second embodiment is the same as the display device 10 according to the first embodiment except for the points described above.

The second embodiment can provide the same advantages as those of the first embodiment except for the specific effects relating to elimination of colored patterns described with reference to FIG. 24.

Modification of the Second Embodiment

Figure 25:
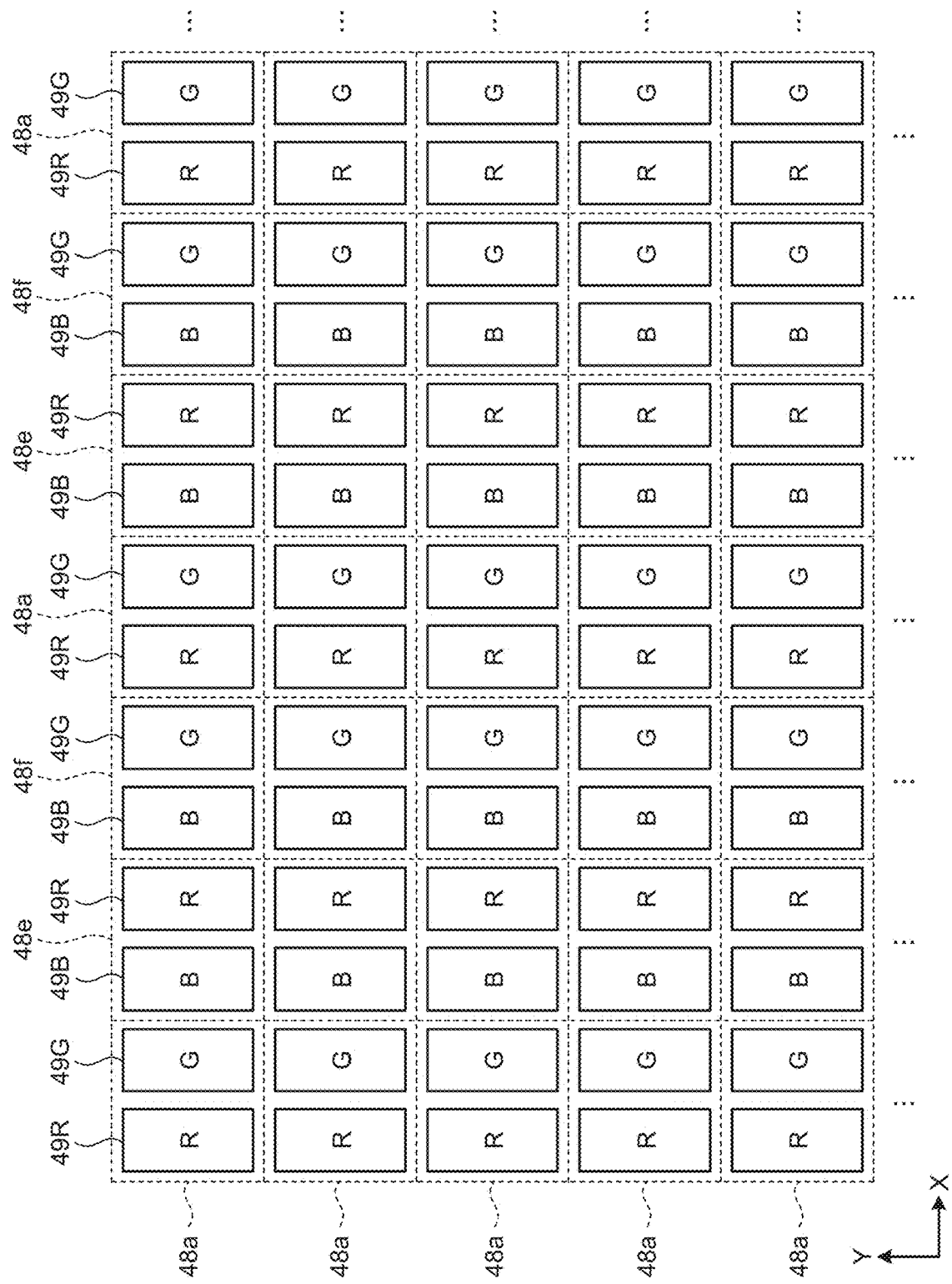
FIG. 25 is a diagram of an example of an arrangement of the pixels and an arrangement of the sub-pixels included in the pixels according to a modification of the second embodiment.

FIG. 25 is a diagram of an example of an arrangement of the pixels 48 and an arrangement of the sub-pixels 49 included in the pixels 48 according to a modification of the second embodiment. Each of the pixels 48 according to the modification of the second embodiment is any one of the first pixel 48a, the fifth pixel 48e, and the sixth pixel 48f. The pixels 48 according to the modification of the second embodiment are arrayed in the order of the first pixel 48a, the fifth pixel 48e, the sixth pixel 48f, the first pixel 48a, the fifth pixel 48e, the sixth pixel 48f, . . . , for example, from the first end side to the second end side in the X-direction of the image display surface. The modification of the second embodiment can provide the same advantageous effects as those of the second embodiment.

Third Embodiment

Figure 26:
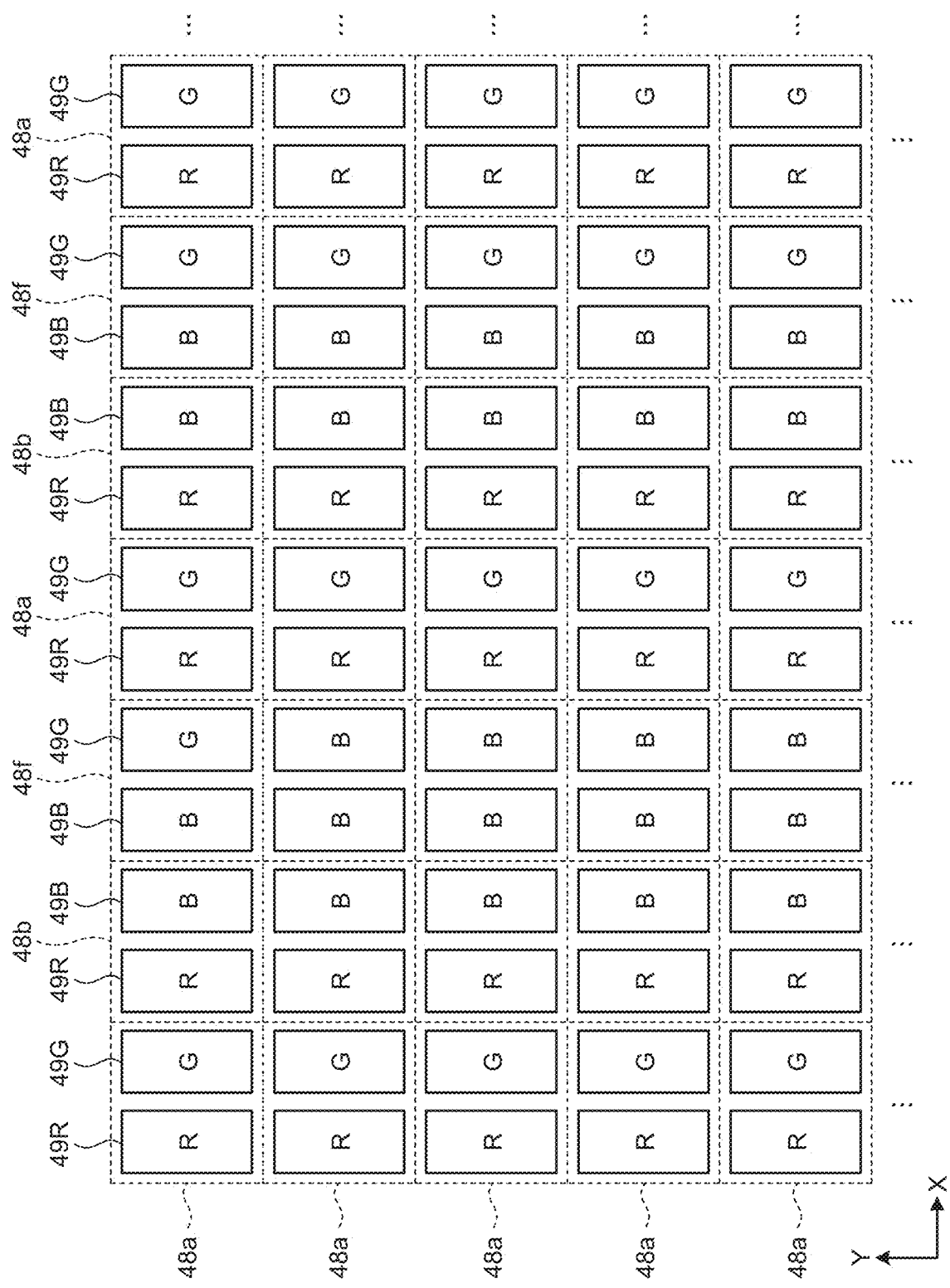
FIG. 26 is a diagram of an example of an arrangement of the pixels and an arrangement of the sub-pixels included in the pixels according to a third embodiment of the present invention.

FIG. 26 is a diagram of an example of an arrangement of the pixels 48 and an arrangement of the sub-pixels 49 included in the pixels 48 according to a third embodiment of the present invention. Each of the pixels 48 according to the third embodiment is any one of the first pixel 48a, the second pixel 48b, and the sixth pixel 48f. The pixels 48 according to the third embodiment are arrayed in the order of the first pixel 48a, the second pixel 48b, the sixth pixel 48f, the first pixel 48a, the second pixel 48b, the sixth pixel 48f, . . . , for example, from the first end side to the second end side in the X-direction of the image display surface. In the configuration according to the third embodiment, two sub-pixels 49 to which a certain color (e.g., blue) out of the three colors is allocated are adjacent to each other in the first direction (e.g., the X-direction).

FIG. 27 is a diagram of an example of color allocation according to the third embodiment. The output gradation values of the patterns 1 to 3 illustrated in FIG. 27 are the same as those of the patterns 1 to 3 illustrated in FIG. 20. In the configuration according to the third embodiment, the second sub-pixel 49G of the first pixel 48a and the third sub-pixel 49B of the second pixel 48b are not adjacent to each other in the X-direction. Consequently, cyan (C) is prevented from being visually recognized. In the configuration according to the third embodiment, the first sub-pixel 49R of the second pixel 48b and the second sub-pixel 49G of the sixth pixel 48f are not adjacent to each other in the X-direction. Consequently, yellow (Y) is prevented from being visually recognized. In the configuration according to the third embodiment, the third sub-pixel 49B of the sixth pixel 48f and the first sub-pixel 49R of the first pixel 48a are not adjacent to each other in the X-direction. Consequently, magenta (M) is prevented from being visually recognized. The display device according to the third embodiment is the same as the display device 10 according to the first embodiment except for the points described above.

In the configuration according to the third embodiment, as with the first embodiment, each pixel 48 includes two sub-pixels 49, and the two colors of the two sub-pixels 49 and the positional relation between the two sub-pixels 49 are the same in each of the pixels 48 arrayed in the second direction (e.g., the Y-direction) of the row direction (X-direction) and the column direction (Y-direction). Consequently, the third embodiment can prevent or reduce generation of bright-and-dark patterns not included in an input image. Furthermore, the sub-pixels 49 to which the same color is allocated are adjacent in the first direction (e.g., the X-direction) with one sub-pixel 49 interposed therebetween, the one sub-pixel 49 being a sub-pixel to which another color is allocated. Consequently, the third embodiment can prevent or reduce generation of colored patterns not included in an input image. As described above, the third embodiment can prevent or reduce generation of patterns not included in an input image.

Two sub-pixels 49 associated with a certain color out of the three colors are adjacent to each other in the first direction (e.g., the X-direction). Consequently, the third embodiment can further prevent or reduce coloring.

The third embodiment calculates the output gradation values based on Expressions (1) and (2). Consequently, the third embodiment can calculate the output gradation values of the respective sub-pixels 49 in a simpler manner based on the uniform expressions.

Modification of the Third Embodiment

Figure 28:
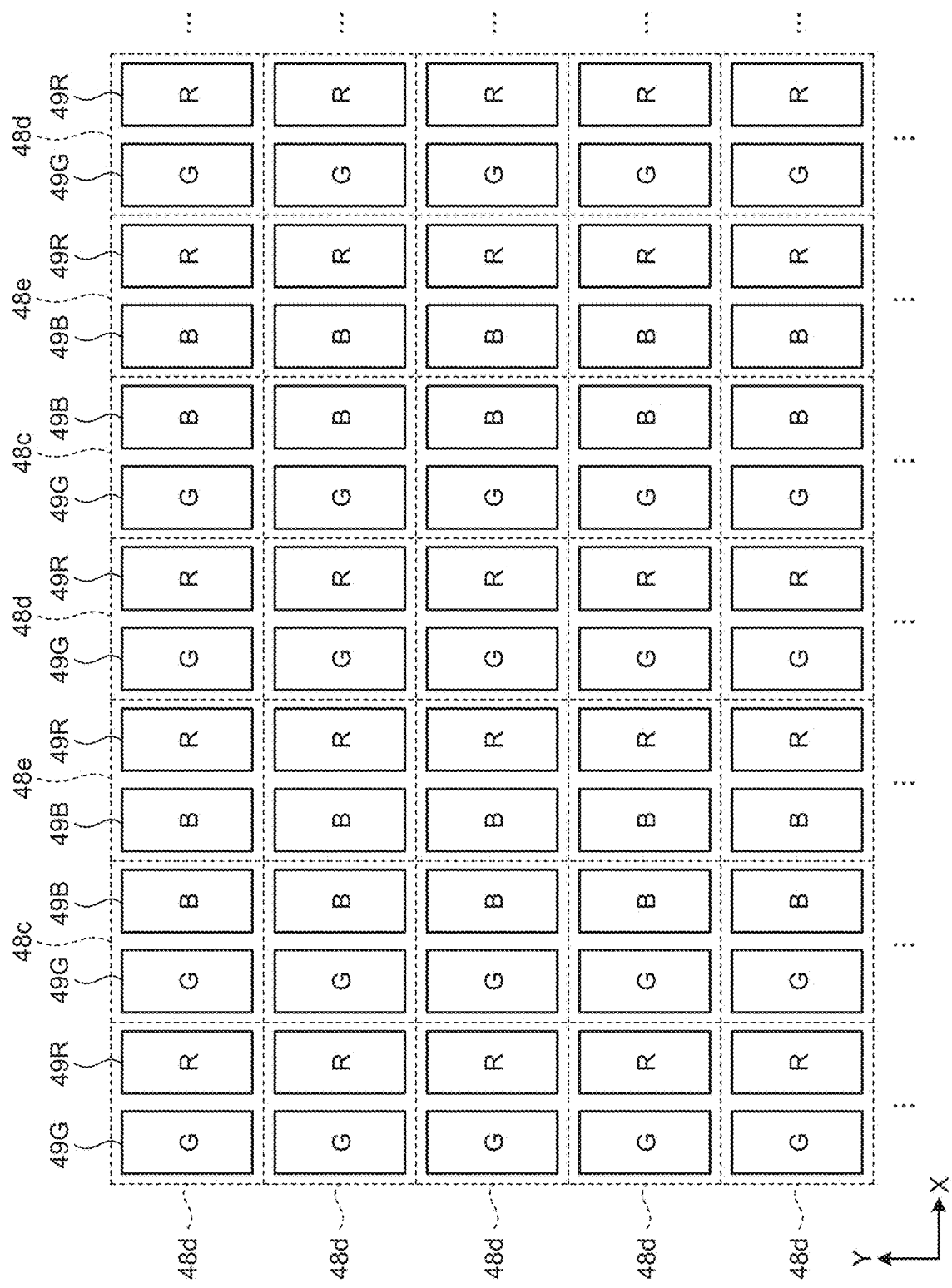
FIG. 28 is a diagram of an example of an arrangement of the pixels and an arrangement of the sub-pixels included in the pixels according to a modification of the third embodiment.

FIG. 28 is a diagram of an example of an arrangement of the pixels 48 and an arrangement of the sub-pixels 49 included in the pixels 48 according to a modification of the third embodiment. Each of the pixels 48 according to the modification of the third embodiment is any one of the fourth pixel 48*d*, the third pixel 48*c*, and the fifth pixel 48*e*. The pixels 48 according to the modification of the third embodiment are arrayed in the order of the fourth pixel 48*d*, the third pixel 48*c*, the fifth pixel 48*e*, the fourth pixel 48*d*, the third pixel 48*c*, the fifth pixel 48*e*, . . . , for example, from the first end side to the second end side in the X-direction of the image display surface. The modification of the third embodiment can provide the same advantages as those of the third embodiment.

Fourth Embodiment

Figure 29:
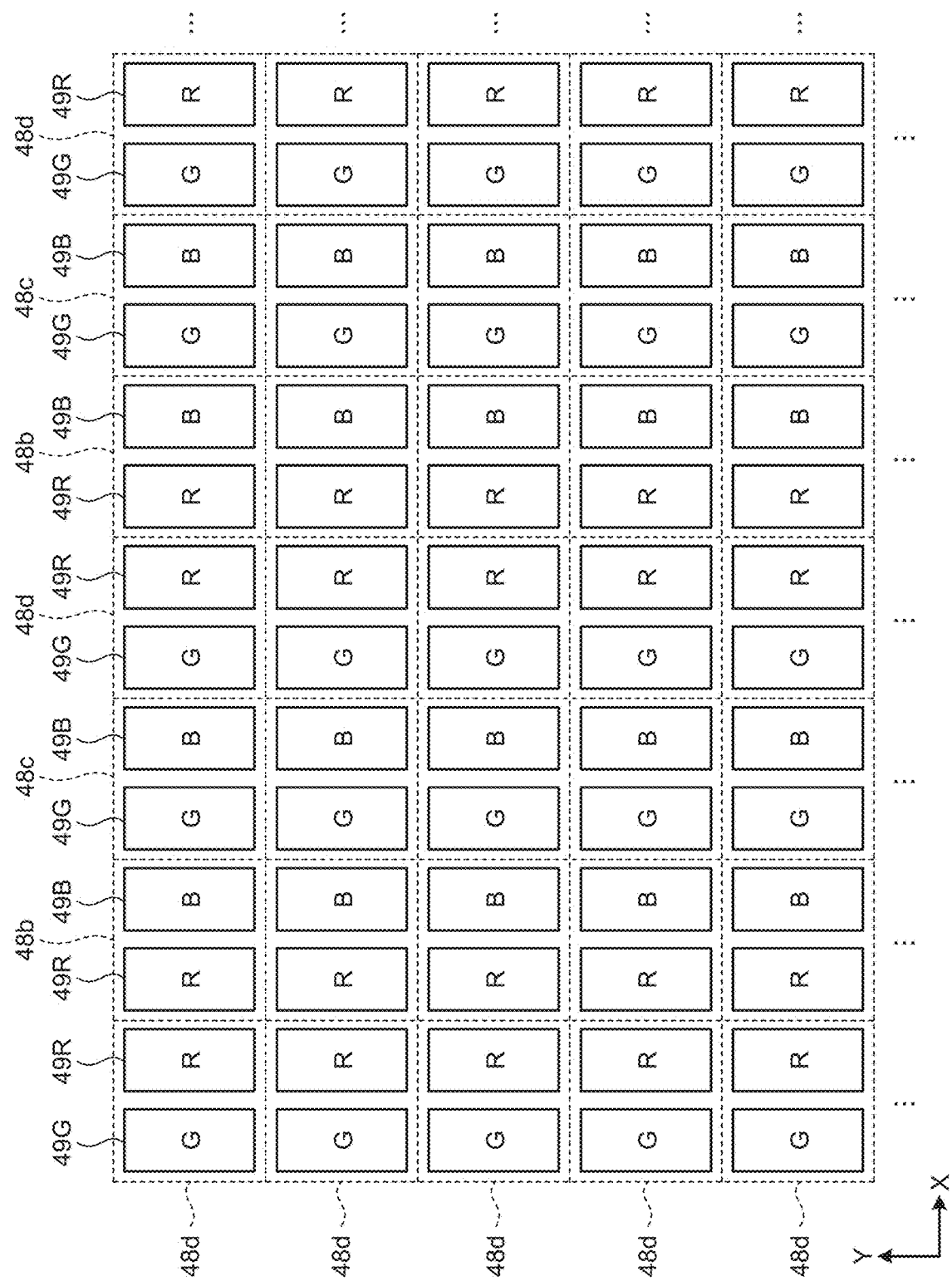
FIG. 29 is a diagram of an example of an arrangement of the pixels and an arrangement of the sub-pixels included in the pixels according to a fourth embodiment of the present invention.

FIG. 29 is a diagram of an example of an arrangement of the pixels 48 and an arrangement of the sub-pixels 49 included in the pixels 48 according to a fourth embodiment of the present invention. Each of the pixels 48 according to the fourth embodiment is any one of the fourth pixel 48*d*, the second pixel 48*b*, and the third pixel 48*c*. The pixels 48 according to the fourth embodiment are arrayed in the order of the fourth pixel 48*d*, the second pixel 48*b*, the third pixel 48*c*, the fourth pixel 48*d*, the second pixel 48*b*, the third pixel 48*c*, . . . , for example, from the first end side to the second end side in the X-direction of the image display surface. In the configuration according to the fourth embodiment, two sub-pixels 49 to which a certain color (e.g., red) out of the three colors is allocated are adjacent to each other in the first direction (e.g., the X-direction).

FIG. 30 is a diagram of an example of color allocation according to the fourth embodiment. The output gradation values of the patterns 1 to 3 illustrated in FIG. 30 are the same as those of the patterns 1 to 3 illustrated in FIG. 20. In the configuration according to the fourth embodiment, the second sub-pixel 49G of the fourth pixel 48*d* and the third sub-pixel 49B of the second pixel 48*b* are not adjacent to each other in the X-direction. Consequently, cyan (C) is prevented from being visually recognized. In the configuration according to the fourth embodiment, the first sub-pixel 49R of the second pixel 48*b* and the second sub-pixel 49G of the third pixel 48*c* are not adjacent to each other in the X-direction. Consequently, yellow (Y) is prevented from being visually recognized. In the configuration according to the fourth embodiment, the third sub-pixel 49B of the third pixel 48*c* and the first sub-pixel 49R of the fourth pixel 48*d* are not adjacent to each other in the X-direction. Consequently, magenta (M) is prevented from being visually recognized. The display device according to the fourth embodiment is the same as the display device according to the third embodiment except for the points described above.

The fourth embodiment can provide the same advantages as those of the third embodiment.

Modification of the Fourth Embodiment

Figure 31:
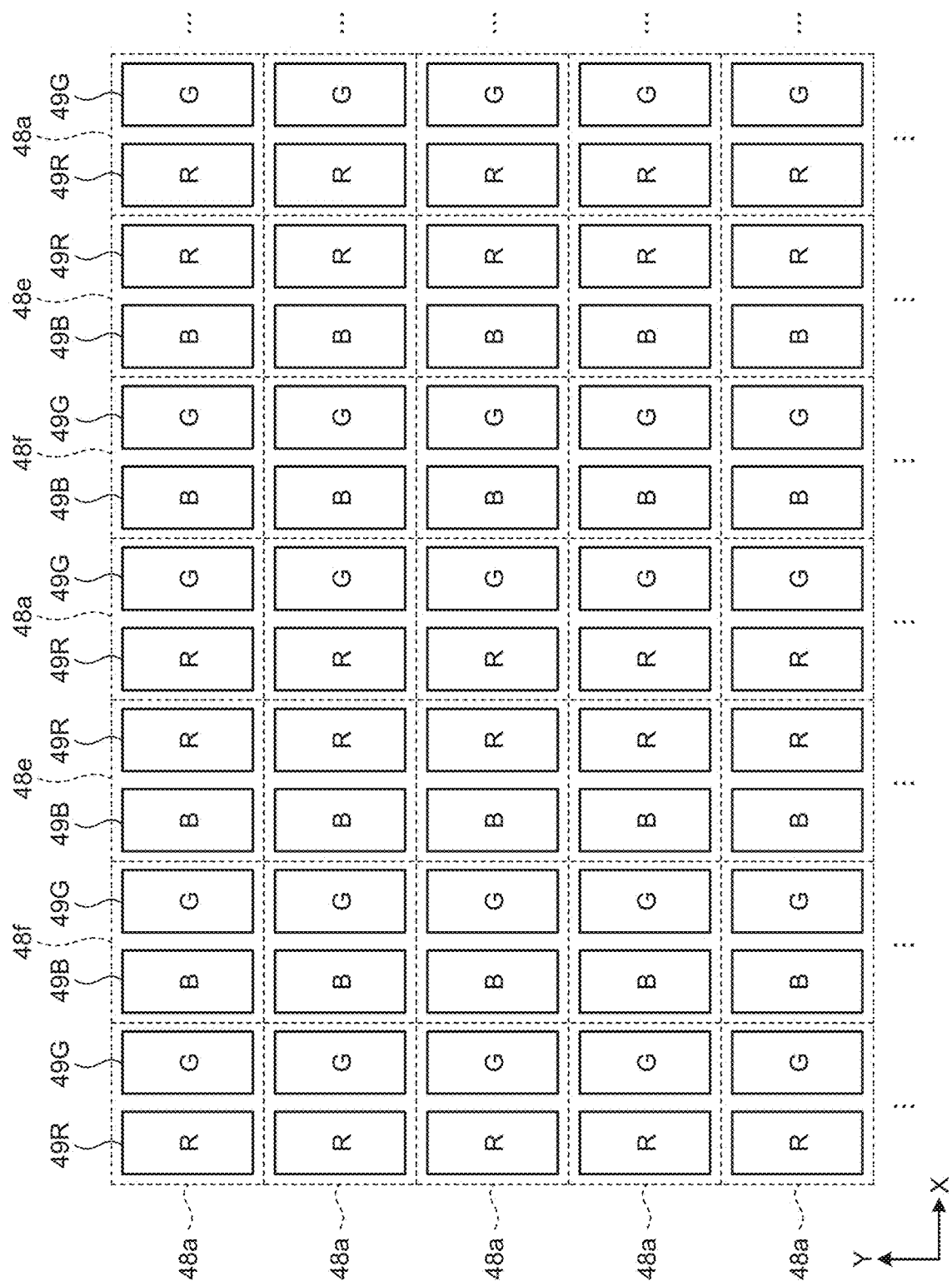
FIG. 31 is a diagram of an example of an arrangement of the pixels and an arrangement of the sub-pixels included in the pixels according to a modification of the fourth embodiment.

FIG. 31 is a diagram of an example of an arrangement of the pixels 48 and an arrangement of the sub-pixels 49 included in the pixels 48 according to a modification of the fourth embodiment. Each of the pixels 48 according to the modification of the fourth embodiment is any one of the first pixel 48*a*, the sixth pixel 48*f*, and the fifth pixel 48*e*. The pixels 48 according to the modification of the fourth embodiment are arrayed in the order of the first pixel 48*a*, the sixth pixel 48*f*, the fifth pixel 48*e*, the first pixel 48*a*, the sixth pixel 48*f*, the fifth pixel 48*e*, . . . , for example, from the first end side to the second end side in the X-direction of the image display surface. The modification of the fourth embodiment can provide the same advantages as those of the fourth embodiment.

The image display panel 40 is not limited to a transmissive color liquid crystal display panel and simply needs to be a display panel in which a plurality of pixels 48 including sub-pixels 49 of two colors are disposed in a matrix (row-column configuration). The specific configuration of the image display panel 40 may be appropriately modified. The image display panel 40 may be a reflective color liquid crystal display panel or an organic electroluminescence (EL) color display panel, for example. If neither the light source driver 50 nor the light source unit 60 is required depending on the specific configuration of the image display panel 40, neither the light source driver 50 nor the light source unit 60 is necessarily provided.

The present invention naturally provides advantageous effects clearly defined by the present specification or appropriately conceivable by those skilled in the art out of other advantageous effects provided by the aspects described in the present embodiment.

What is claimed is:

1. A display device comprising a plurality of pixels arrayed in a row direction and a column direction, wherein
   each pixel includes two sub-pixels adjacent to each other in a first direction, the first direction being one of the row direction and the column direction,
   each sub-pixel has one of three colors allocated thereto,
   two colors of the two sub-pixels included in the pixel are different,
   the two colors of the two sub-pixels and a positional relation between the two sub-pixels are the same in each of the pixels arrayed in a second direction, the second direction being the other of the row direction and the column direction,
   at least three sub-pixels that are consecutive in the second direction are the same in color,
   one color not allocated to the two sub-pixels included in a first pixel out of the three colors is allocated to at least one of the sub-pixels included in second pixels adjacent to the first pixel in the first direction, and
   the sub-pixels having the same color allocated thereto are arranged along the first direction with one sub-pixel interposed therebetween, the one sub-pixel having another color allocated thereto.

2. The display device according to claim 1, wherein sub-pixels having one of two colors out of the three colors allocated thereto are arranged along the first direction with one sub-pixel interposed therebetween, the one sub-pixel having a remaining color other than the two colors of the three colors allocated thereto.

3. The display device according to claim 2, wherein
   the two colors are red and blue, and
   the remaining color is green.

4. The display device according to claim 2, wherein
   the two colors are red and green, and
   the remaining color is blue.

5. The display device according to claim 1, wherein two sub-pixels having a certain color out of the three colors allocated thereto are adjacent to each other in the first direction.

6. The display device according to claim 5, wherein
   the certain color is blue, and
   two colors other than the certain color out of the three colors are red and green.

7. The display device according to claim 5, wherein
   the certain color is red, and two colors other than the certain color out of the three colors are green and blue.

8. The display device according to claim 1, wherein, when a color component of one color not allocated to the two sub-pixels included in the first pixel is received, the color component is allocated to at least one of the sub-pixels of the one color included in the second pixels adjacent to the first pixel.

9. A display device comprising:

a plurality of pixels arrayed in a row direction and a column direction; and a signal processor configured to calculate output gradation values of the respective sub-pixels based on gradation values of the three colors included in input signals for the respective pixels, wherein each pixel includes two sub-pixels adjacent to each other in a first direction, the first direction being one of the row direction and the column direction, each sub-pixel has one of three colors allocated thereto, two colors of the two sub-pixels included in the pixel are different, the two colors of the two sub-pixels and a positional relation between the two sub-pixels are the same in each of the pixels arrayed in a second direction, the second direction being the other of the row direction and the column direction, one color not allocated to the two sub-pixels included in a first pixel out of the three colors is allocated to at least one of the sub-pixels included in second pixels adjacent to the first pixel in the first direction, and the sub-pixels having the same color allocated thereto are arranged along the first direction with one sub-pixel interposed therebetween, the one sub-pixel having another color allocated thereto, when a color component of one color not allocated to the two sub-pixels included in the first pixel is received, the color component is allocated to at least one of the sub-pixels of the one color included in the second pixels adjacent to the first pixel, wherein the signal processor calculates, when the gradation value of one color included in the input signal for one pixel of two pixels adjacent to each other is larger than the gradation value of the one color included in the input signal for the other pixel of the two pixels, the output gradation value of the sub-pixel of the one color included in the one pixel based on Expression (1):

$$\mathrm{Out}(n)=\mathrm{In}(n)-(\mathrm{In}(n)-\mathrm{In}(m))\times a \qquad (1),$$

the signal processor calculates, when the gradation value of the one color included in the input signal for the one pixel is smaller than the gradation value of the one color included in the input signal for the other pixel, the output gradation value of the sub-pixel of the one color included in the one pixel based on Expression (2):

$$\mathrm{Out}(n)=\mathrm{In}(n)+(\mathrm{In}(m)-\mathrm{In}(n))\times b \qquad (2),$$

in Expression (1) and Expression (2), Out(n) is the output gradation value of the sub-pixel of the one color included in the one pixel, In(n) is the gradation value of the one color included in the input signal for the one pixel, and In(m) is the gradation value of the color included in the input signal for the other pixel, and a in Expression (1) and b in Expression (2) satisfy a<b.

10. The display device according to claim 9, wherein sub-pixels having one of two colors out of the three colors allocated thereto are arranged along the first direction with one sub-pixel interposed therebetween, the one sub-pixel having a remaining color other than the two colors of the three colors allocated thereto.

11. The display device according to claim 10, wherein the two colors are red and blue, and
the remaining color is green.

12. The display device according to claim 10, wherein the two colors are red and green, and
the remaining color is blue.

13. The display device according to claim 9, wherein two sub-pixels having a certain color out of the three colors allocated thereto are adjacent to each other in the first direction.

14. The display device according to claim 13, wherein the certain color is blue, and
two colors other than the certain color out of the three colors are red and green.

15. The display device according to claim 13, wherein the certain color is red, and
two colors other than the certain color out of the three colors are green and blue.

* * * * *